(12) United States Patent
Takahashi et al.

(10) Patent No.: US 8,462,596 B2
(45) Date of Patent: Jun. 11, 2013

(54) OPTICAL PICKUP DEVICE AND OPTICAL DISC DEVICE

(75) Inventors: Yuichi Takahashi, Nara (JP); Kazuo Momoo, Osaka (JP); Hiroaki Matsumiya, Osaka (JP); Jun-ichi Asada, Hyogo (JP)

(73) Assignee: Panasonic Corporation, Osaka (JP)

( * ) Notice: Subject to any disclaimer, the term of this patent is extended or adjusted under 35 U.S.C. 154(b) by 2900 days.

(21) Appl. No.: 13/511,017

(22) PCT Filed: Nov. 24, 2010

(86) PCT No.: PCT/JP2010/006855
§ 371 (c)(1),
(2), (4) Date: May 21, 2012

(87) PCT Pub. No.: WO2011/064992
PCT Pub. Date: Jun. 3, 2011

(65) Prior Publication Data
US 2012/0287766 A1 Nov. 15, 2012

(30) Foreign Application Priority Data
Nov. 24, 2009 (JP) .................................. 2009-265962

(51) Int. Cl.
*G11B 7/00* (2006.01)

(52) U.S. Cl.
USPC ......................................... 369/44.24; 369/94

(58) Field of Classification Search
None
See application file for complete search history.

(56) References Cited

U.S. PATENT DOCUMENTS

2007/0242575 A1 10/2007 Nakamura et al.
2008/0084797 A1 4/2008 Sano et al.
2008/0101199 A1 5/2008 Yamasaki et al.
2008/0123492 A1 5/2008 Mori et al.
2008/0175110 A1 7/2008 Yamasaki et al.

FOREIGN PATENT DOCUMENTS

JP 2005-063595 A 3/2005

(Continued)

OTHER PUBLICATIONS

International Search Report for corresponding International Application No. PCT/JP2010/006855 mailed Mar. 1, 2011.

(Continued)

*Primary Examiner* — Wayne Young
*Assistant Examiner* — Brian Butcher
(74) *Attorney, Agent, or Firm* — Renner, Otto, Boisselle & Sklar, LLP

(57) ABSTRACT

When performing recording/reproduction of information for a given recording layer of an optical disc having three recording layers, influences of reflected light from other recording layers are reduced or removed, thus making it possible to obtain a more stable RF signal or focus error signal.

An optical pickup device includes a light source, a collimator lens, an objective lens, a photodetector, and a light shielding member. Among the recording layers of the optical disc, a first layer and a second layer adjoining each other are disposed in the order of the first layer and second layer from near the objective lens. The light shielding member is disposed at a position satisfying the condition d>d1 to block a part of reflected light from the second layer when light is converged on the first layer, where d is an optical path length from the photodetector to the light shielding member; and d1 is a distance from the photodetector to a position at which reflected light from the second layer becomes focused between the collimator lens and the photodetector.

4 Claims, 21 Drawing Sheets

FOREIGN PATENT DOCUMENTS

| | | |
|---|---|---|
| JP | 2007-073115 A | 3/2007 |
| JP | 2008-130219 A | 6/2008 |
| JP | 2008-135151 A | 6/2008 |
| JP | 2008-198256 A | 8/2008 |
| JP | 2008-269756 A | 11/2008 |
| JP | 2009-070419 A | 4/2009 |
| JP | 2009-070437 A | 4/2009 |

OTHER PUBLICATIONS

Form PCT/ISA/237 for corresponding International Application No. PCT/JP2010/006855 dated Mar. 1, 2011, with partial English translation.

FIG.9
FOCUS IS ON L1
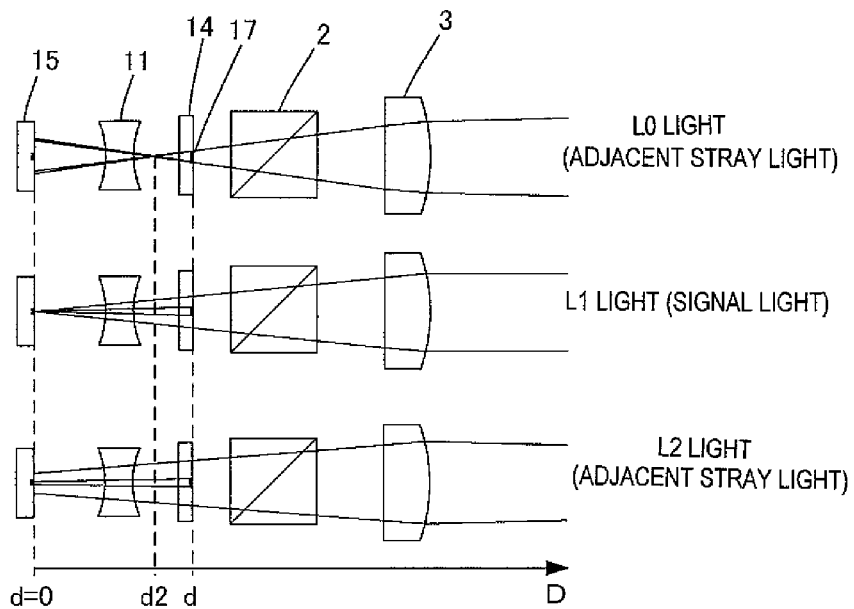
FIG.10
FOCUS IS ON L0
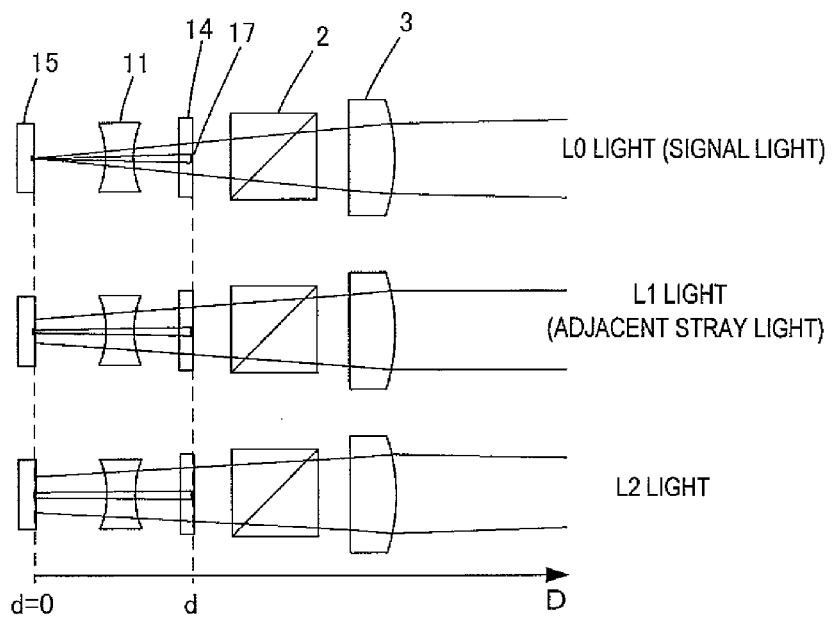

111: LIGHT FROM CONVERGED LAYER
112: L0 (100 μm) STRAY LIGHT WHEN CONVERGED ON L1 (75 μm)
113: L1 (75 μm) STRAY LIGHT WHEN CONVERGED ON L2 (58 μm)
114: L2 (58 μm) STRAY LIGHT WHEN CONVERGED ON L1 (75 μm)
115: L1 (75 μm) STRAY LIGHT WHEN CONVERGED ON L0 (100 μm)

POSITION OF LIGHT SHIELDING PORTION d[mm]

111: LIGHT FROM CONVERGED LAYER
112: L0 (100 μm) STRAY LIGHT WHEN CONVERGED ON L1 (75 μm)
113: L1 (75 μm) STRAY LIGHT WHEN CONVERGED ON L2 (58 μm)
114: L2 (58 μm) STRAY LIGHT WHEN CONVERGED ON L1 (75 μm)
115: L1 (75 μm) STRAY LIGHT WHEN CONVERGED ON L0 (100 μm)

OPTICAL PICKUP DEVICE AND OPTICAL DISC DEVICE

TECHNICAL FIELD

The present invention relates to a technique of optically performing recording or reproduction of information for a storage medium such as an optical disc.

BACKGROUND ART

In recent years, optical disc apparatuses which optically record information onto a storage medium or reproduce optically-recorded information have gained wide prevalence. As such storage media, for example, optical discs such as the compact disc (hereinafter abbreviated as "CD"), the Digital Versatile Disc (hereinafter abbreviated as "DVD"), and the Blu-ray Disc (hereinafter abbreviated as "BD") are known. Various kinds of information, e.g., video, images, and audio, can be recorded on an optical disc.

In particular, the DVD and the BD, which are expected for use in recording video information that entails large amounts of information, e.g., movies, are facing desires to accommodate a work of long hours on a single disc, as well as intense needs to enhance the value-added of a packaged medium by storing various bonus videos. Therefore, for an increased capacity of storable information, optical discs possessing two recording layers have already been put to practical use, and are widely used on the market. In the case of the BD, which is capable of recording high-quality video information, studies are undertaken to adopt multiple recording layers for a further increase in its capacity, and discs and devices that are adapted for three layers or four layers are considered for standardization.

For example, in order to reproduce information from an optical disc, it is necessary to converge laser light onto a recording layer of interest, and detect reflected light therefrom by using a photodetector. However, as the layers of a disc increase in number, there arises a problem in that reflected light from a layer(s) other than the layer from which information is being reproduced (hereinafter referred to as "stray light from other layers") may enter the photodetector to cause noises, thus deteriorating the qualities of the reproduction signal and control signals.

The above problem will be described with respect to a construction in which focus signal detection based on an astigmatic method using a cylindrical lens is performed, and a construction in which tracking signal detection based on a three beam method is performed, as specific constructions for a generic optical pickup device.

FIG. 28 shows an exemplary construction of a generic optical pickup. Light going out from a semiconductor laser 1 as a light source is transmitted through a diffraction grating 13 for generating three beams, reflected by a polarization beam splitter 2, and converted by a collimating lens 3 to a substantially parallel light beam. This parallel light beam is reflected by a mirror 4, transmitted through a wavelength plate 5, and converged by an objective lens 6 onto an optical disc 7 as a storage medium.

The optical disc 7 has at least three recording layers. In the present specification, the three adjoining recording layers are designated as recording layers 7a, 7b, and 7c, appearing in this order as seen from the objective lens 6. Hereinafter, the recording layers 7a, 7b, and 7c will be referred to as an L2 layer, an L1 layer, and an L0 layer, respectively.

FIG. 28 shows an optical path of light which is converged by the recording layer 7b. The reflected light from the L1 layer (recording layer 7b) reaches the polarization beam splitter 2 through an opposite path. At this point, due to the action of the wavelength plate 5, the polarization state of the reflected light has been converted to a state which is different from the polarization state in the forward path; therefore, much of the light reaching the polarization beam splitter 2 is transmitted, passes through a cylindrical lens 11, and enters a photodetector 15. The light entering the photodetector 15 will hereinafter be referred to as "detected light 9". The detected light 9 contains three beams, i.e., a main beam 9a and sub beams 9b and 9c.

FIG. 29 shows the construction of the photodetector 15. The main beam 9a enters a photodetecting portion 151, whereas the sub beams 9b and 9c respectively enter photodetecting portions 152 and 153. An RF signal is generated from a light amount signal of the main beam 9a as detected at the photodetecting portion 151. On the other hand, a focus error signal and a tracking error signal are generated by using, in addition to the light amount signal of the main beam 9a as detected at the photodetecting portion 151, the light amount signals of the sub beams 9b and 9c as detected by the photodetecting portion 152 and the photodetecting portion 153. The principles of detection of the RF signal, the focus error signal, and the tracking error signal are already known, and these detection principles in themselves do not pertain to the essence of the present invention; therefore, the detailed descriptions thereof are omitted.

FIG. 30 shows an optical path of reflected light from the rearward-adjoining L0 layer (recording layer 7c) when light for recording or reproduction of information is converged on the L1 layer (recording layer 7b). Since the reflected light from the L0 layer once becomes focused between the collimator lens 3 and the photodetector 15, it enters the photodetector 15 in a greatly defocused state. FIG. 31 shows reflected light 9d from the L0 layer upon the photodetector 15. The reflected light 9d is defocused, and has a large expanse on the photodetector 15, spreading over the photodetecting portions 151 to 153. Therefore, the reflected light 9d has interference with the main beam 9a and the sub beams 9b and 9c, from which the RF signal and focusing and tracking error signals are generated.

FIG. 32 shows an optical path of reflected light from the frontward-adjoining L2 layer (recording layer 7a) when light is converged on the L1 layer (recording layer 7b). The reflected light from the L2 layer does not become focused before the photodetector 15, and enters the photodetector 15 in a greatly defocused state.

FIG. 33 shows reflected light 9e from the L2 layer upon the photodetector 15. The reflected light 9e is defocused, and has a large expanse on the photodetector 15, spreading over the photodetecting portions 151 to 153. Therefore, the reflected light 9e has interference with the main beam 9a and the sub beams 9b and 9c, from which the RF signal and focusing and tracking error signals are generated.

Due to the influences of manufacturing errors and the like, the inter-layer thickness between the L1 layer and the L2 layer is not always constant, but may locally fluctuate. Therefore, the optical path length will change while the disc makes one rotation. As a result, the state of interference will always be changing. Therefore, when information is reproduced or recorded by using a multilayer disc of three layers or more with an optical pickup having such a construction, the stray light from the forward and rearward layers will interfere with the main beam 9a and the sub beams 9b and 9c, and the RF signal and focusing and tracking error signals will always be changing in amplitude and offset. This is a cause for substantial degradation of the qualities of the reproduction signal and control signals.

Regarding this problem, where the stray light from other layers affects the control signals, a solution as shown in Patent Document 1 has been proposed. FIG. 34 is a diagram for describing the construction and operation of an optical pickup device described in Patent Document 1.

In Patent Document 1, photodetecting portions for tracking error signal detection are placed at positions which are not struck by reflected light from any other layers, and a diffraction element is employed to direct a beam to be used for tracking error generation toward such positions. This makes it possible to detect a high-quality tracking error signal which is free from the influences of reflected light from the other layers, thus ensuring stability of the tracking operation on a multilayer disc. This will be specifically described below.

Light going out from a semiconductor laser 1 as a light source is reflected by a polarization beam splitter 2, and converted to a substantially parallel light beam by collimating lens 3. This parallel light beam is reflected by a mirror 4, transmitted through a wavelength plate 5, and converged by an objective lens 6 onto an optical disc 7 as a storage medium. FIG. 34 shows an optical path of light converged on the L1 layer.

The reflected light from the L1 layer reaches the polarization beam splitter 2 through an opposite path. As in the earlier example, the polarization state has been converted at this point, and therefore much of the light reaching the polarization beam splitter 2 is transmitted so as to further enter a diffraction element 8.

The detected light 9 ($0^{th}$ order light) which is not diffracted by the diffraction element 8 moves straight, and passes through a cylindrical lens 11 to enter a photodetector 12. On the other hand, the detected light 10 (diffracted light) which is diffracted by the diffraction element 8 strikes different positions on the photodetector 12 from that of the detected light 9.

FIG. 35 shows the construction of the photodetector 12. The detected light 9 enters the four-divided photodetecting portion 121. By using the detected light 9, RF signal detection and focus error signal detection by the astigmatic method are performed. On the other hand, the detected light 10 is split by the diffraction element 8 into four beams 10a, 10b, 10c, and 10d in a region-by-region manner, which respectively strike photodetecting portions 102a, 102b, 102c, and 102d. By using the beams 10a, 10b, 10c, and 10d composing the detected light 10, tracking error signal detection is performed. The principles of detection of the RF signal and the focus error signal (astigmatic method) pertain to an already known technique, and the principles of detection of the tracking error signal are described in detail in Patent Document 1, and these detection principles in themselves do not pertain to the essence of the present invention; therefore, the descriptions thereof are omitted.

FIG. 36 shows an optical path of reflected light from the rearward-adjoining L0 layer when light is converged on the L1 layer. The reflected light from the L0 layer once becomes focused between the collimator lens 3 and the photodetector 12, and enters the photodetector 12 in a greatly defocused state.

FIG. 37 shows reflected light 9d from the L0 layer upon the photodetector 12. Since the reflected light 9d is defocused, it protrudes widely off the photodetecting portion 121. However, the photodetecting portions 102a to 102d for tracking error signal detection are provided outside the reflected light 9d, they are not struck by the reflected light 9d. Therefore, the tracking error signal is not affected by the reflected light from the adjoining rear recording layer.

FIG. 38 shows the behavior of reflected light from the frontward-adjoining L2 layer when light is converged on the L1 layer. The light reflected by the L2 layer does not become focused before the photodetector 12, and enter the photodetector 12 in a greatly defocused state.

FIG. 39 shows reflected light 9e from the L2 layer upon the photodetector 12.

Since the reflected light 9e is defocused, it protrudes widely off the photodetecting portion 121. However, since the photodetecting portions 102a to 102d for tracking error signal detection are provided outside the reflected light 9e, they are not struck by the reflected light 9d. Therefore, the tracking error signal is not affected by the reflected light from the adjoining frontward recording layer.

CITATION LIST

Patent Literature

[Patent Document 1] Japanese Laid-Open Patent Publication No. 2008-135151

SUMMARY OF INVENTION

Technical Problem

In the conventional constructions, influences of reflected light from the other layers can be eliminated so far the tracking error signal is concerned.

However, the photodetecting portion for the main beam for detecting an RF signal or a focus error signal will be struck by reflected light from the other layers. In particular, in a multilayer disc of three layers or more, the reflectance per recording layer is decreased, and the amount of unwanted reflected light from the forward and rearward layers increases relative to the signal light. Therefore, due to interference between the reflected light from the other layers entering the photodetecting portion for detecting the main beam ($0^{th}$ order light) and the main beam itself (reproduction light), increases in the noise, amplitude fluctuation, and the like will occur. This has led to a problem in that deteriorations in the quality of the RF signal and the focus error signal may occur, thus making stable signal reproduction or focus control difficult.

The present invention has been made in view of the above problems, and an objective thereof is, in the case where information is to be read from a given layer or information is to be recorded on a given layer of a storage medium having a plurality of recording layers, to provide a construction for reducing or removing the influences of reflected light from the other layers, thus obtaining a more stable RF signal or focus error signal.

Solution to Problem

An optical pickup device according to the present invention is an optical pickup device for performing recording or reproduction of information by converging light onto an optical disc having three recording layers, the optical pickup device comprising: a light source for emitting light; a collimator lens for converting the light emitted from the light source into substantially parallel light; an objective lens for converging the light having been converted to the substantially parallel light onto the optical disc; a photodetector for receiving reflected light from the optical disc via the collimator lens; and a light shielding member provided in an optical path between the collimator lens and the photodetector for blocking a part of the reflected light and transmitting the rest, wherein, among the recording layers of the optical disc, a first layer and a second layer adjoining each other are disposed in the order of the first layer and second layer from near the objective lens; and the light shielding member is disposed at a position satisfying the condition $d>d1$ to block a part of reflected light from the second layer when the light is converged on the first layer, where d is an optical path length from the photodetector to the light shielding member; $d1$ is a distance from the detector to a position at which reflected light from the second layer becomes focused between the collimator lens and the photodetector.

From near the objective lens, the storage medium may include the first layer, the second layer, and a third layer; and the light shielding member may be disposed at a position satisfying the condition $d \geq 2 \times d1 \times d2/(d1+d2)$ when the light is converged by the objective lens onto the second layer, where $d2$ is a distance from the detector to a position at which reflected light from the third layer becomes focused between the collimator lens and the photodetector.

The light shielding member may include a substantially circular light shielding portion for blocking a part of the reflected light; and the light shielding portion may completely block reflected light from the second layer when the light is converged on the first layer and reflected light from the third layer when the light is converged on the second layer, and the light shielding portion may have a radius which is 30% or less, when the light is converged on an $n^{th}$ layer (n: 1, 2, 3), of a radius of reflected light from the $n^{th}$ layer entering the light shielding member.

The light shielding member may include a substantially circular light shielding portion for blocking a part of the reflected light; and the light shielding portion may block 50% or less of either reflected light from the second layer when the light is converged on the first layer or reflected light from the third layer when the light is converged on the second layer.

The optical pickup device may further comprise a diffraction element for diffracting a part of reflected light from an $n^{th}$ layer (n: 1, 2, 3) when the light is converged on the $n^{th}$ layer, the diffraction element being provided at a position closer to the photodetector than is the light shielding member, wherein, the light shielding member may include a substantially circular light shielding portion for blocking a part of the reflected light; and at a position which is not struck by reflected light from any other recording layer than the $n^{th}$ layer when the light is converged on the $n^{th}$ layer, the photodetector may include a photodetecting portion for receiving at least a part of the diffracted reflected light from the $n^{th}$ layer.

The diffraction element may diffract a part of reflected light from an $n^{th}$ layer, but not diffract the rest; the photodetector may further include a photodetecting portion for receiving undiffracted reflected light from the $n^{th}$ layer; and within the reflected light from any other recording layer than the $n^{th}$ layer when the light is converged on the $n^{th}$ layer, the light shielding portion may block any reflected light that overlaps the undiffracted reflected light from the $n^{th}$ layer.

Another optical pickup device according to the present invention is an optical pickup device for performing recording or reproduction of information by converging light onto an optical disc having three recording layers, the optical pickup device comprising: a light source for emitting light; a collimator lens for converting the light emitted from the light source into substantially parallel light; a wavelength plate for changing a polarization state of the light having been converted to the substantially parallel light depending on a position which is struck by the light; an objective lens for converging the light onto the optical disc; and a photodetector for receiving reflected light from the optical disc via the wavelength plate and the collimator lens, wherein, after being transmitted through the wavelength plate, within the reflected light from the optical disc, reflected light from an $n^{th}$ layer (n: 1, 2, 3) when the light is converged on the $n^{th}$ layer has a portion in a first polarization state, and reflected light from any other recording layer than the $n^{th}$ layer has a portion in a second polarization state which is different from the first polarization state; and the photodetector receives the reflected light in the first polarization state, but does not receive the reflected light in the second polarization state.

The optical pickup device may further comprise an optical element provided between the wavelength plate and the photodetector for separating the light in the first polarization state and the light in the second polarization state into different directions, wherein, the optical element may allow reflected light in the first polarization state to be transmitted to the photodetector.

The wavelength plate may include a central region through which an optical axis of incident light passes and a peripheral region surrounding the central region; the central region may be formed so as to define zero phase difference or a $\lambda/2$ wavelength plate; the peripheral region may be formed so as to define a $\lambda/4$ wavelength plate; the reflected light from the $n^{th}$ layer may include portions which are respectively transmitted through the central region and the peripheral region to take the second polarization state and the first polarization state; the reflected light from any other recording layer than the $n^{th}$ layer may be transmitted through the central region to take the second polarization state; and within the reflected light from the $n^{th}$ layer, the optical element may allow the reflected light which is transmitted through the peripheral region and takes the first polarization state to be transmitted to the photodetector.

Still another optical pickup device according to the present invention is an optical pickup device for performing recording or reproduction of information by converging light onto an optical disc having three recording layers, the optical pickup device comprising: a light source for emitting light; a collimator lens for converting the light emitted from the light source into substantially parallel light; a diffraction element having a central region through which an optical axis of incident light passes and a peripheral region surrounding the central region, the diffraction element not diffracting the incident light when the light entering the central region is in a first polarization state, but diffracting the incident light when in a second polarization state which is different from the first polarization state; an objective lens for converging the light onto the optical disc; and a photodetector for receiving reflected light from the optical disc via the wavelength plate and the collimator lens, wherein, the substantially parallel light from the collimator lens is light in the first polarization state; when the light converged by the objective lens is converged on an $n^{th}$ layer (n: 1, 2, 3), reflected light from any other recording layer than the $n^{th}$ layer is in the second polarization state and is transmitted through the central region; and the diffraction element diffracts reflected light from any other recording layer than the $n^{th}$ layer, such that the photodetector receives reflected light from the $n^{th}$ layer, but receives no reflected light other than from the $n^{th}$ layer.

An optical disc apparatus according to the present invention comprises the above optical pickup; a transportation motor for moving the optical pickup device; a spindle motor for rotating the optical disc; a driving circuit for driving the transportation motor and the spindle motor; and a control section for designating driving parameters for the transportation motor and the spindle motor to the driving circuit.

Advantageous Effects of Invention

According to the present invention, in the case where an optical pickup device reads information from a given layer or records information on a given layer of a storage medium having a plurality of recording layers, influences of reflected light from the other layers can be removed and a more stable RF signal or focus error signal can be obtained.

BRIEF DESCRIPTION OF DRAWINGS

FIG. 9 A diagram showing the respective reflected light from L0, L1, and L2 layers when light is converged on an L1 layer.

FIG. 10 A diagram showing the respective reflected light from L0, L1, and L2 layers when light is converged on an L0 layer.

DESCRIPTION OF EMBODIMENTS

Figure 1:
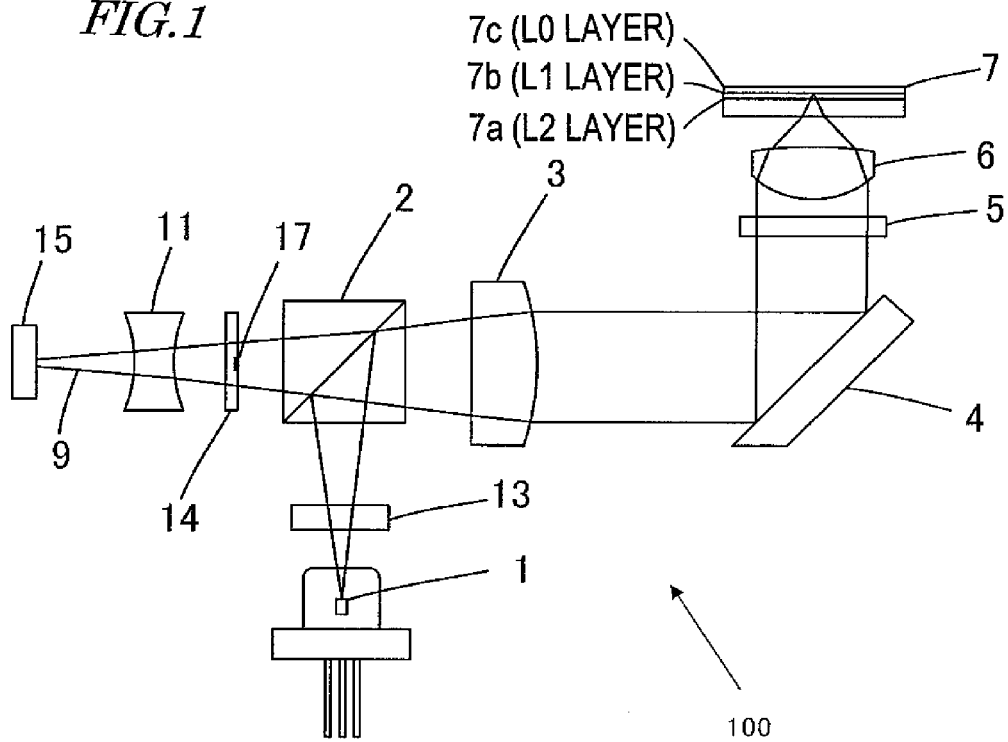
FIG. 1 A diagram showing the construction of an optical pickup device 100 according to Embodiment 1 of the present invention.

Hereinafter, with reference to the attached drawings, Embodiments of an optical pickup device and optical disc apparatus according to the present invention will be described. In the drawings, any elements with identical or similar functions and/or constructions are denoted by the same reference numeral. Note that the following Embodiments are examples of embodying the present invention, and do not limit the technological scope of the present invention.

Embodiment 1

FIG. 1 shows the construction of an optical pickup device 100 according to the present embodiment.

Light emitted from a semiconductor laser 1 as a light source is transmitted through a diffraction grating 13 for generating three beams, reflected by a polarization beam splitter 2, and converted to a substantially parallel light beam by a collimator lens 3. This parallel light beam is reflected by a mirror 4, transmitted through a wavelength plate 5, and converged by an objective lens 6 onto an optical disc 7 as a storage medium. FIG. 1 shows an optical path of light which is converged on an L1 layer.

The reflected light from the L1 layer reaches the polarization beam splitter 2 through an opposite path. At this point, due to the action of the wavelength plate 5, the polarization state of the reflected light has been converted to a state which is different from the polarization state in the forward path; therefore, much of the light reaching the polarization beam splitter 2 is transmitted so as to enter a light shielding member 14.

Figure 2:
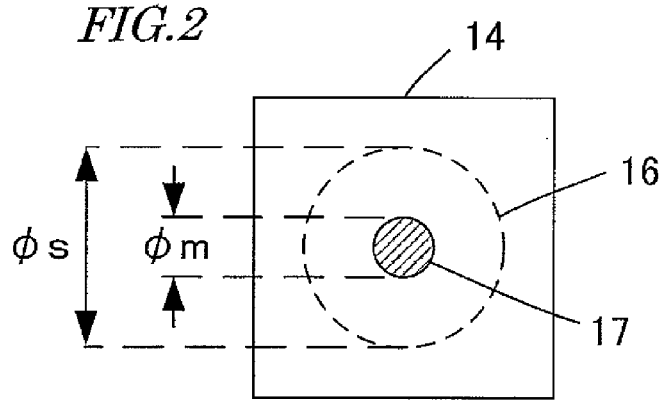
FIG. 2 A diagram showing the construction of a light shielding member 14.

FIG. 2 shows the construction of the light shielding member 14. The light shielding member 14 in FIG. 2 is disposed between the polarization beam splitter 2 and a cylindrical lens 11 of the optical pickup device 100. When it is disposed in the optical pickup device 100, the optical axis is in a direction which is perpendicular to the plane of the figure.

The light shielding member 14 includes a light shielding portion 17 having a function of blocking light and the other region (transmission portion). The light shielding portion 17 is made of a reflection film which is composed of a multilayer film of $SiO_2$ (silicon dioxide) and $Ta_2O_5$ (tantalum oxide), for example. The shape of the light shielding portion 17 is substantially circular. The transmission portion of the light shielding member 14 intactly allows light to be transmitted therethrough.

In FIG. 2, the diameter of a cross section 16 of the main beam among the three beams when passing through the light shielding member 14 is indicated as "$\phi s$", and the diameter of the light shielding portion 17 as "$\phi m$". The specific values of $\phi s$ and $\phi m$ will be described later.

The light having been transmitted through the region other than the light shielding portion 17 of the light shielding member 14 passes through the cylindrical lens 11, and enters a photodetector 15.

Figure 3:
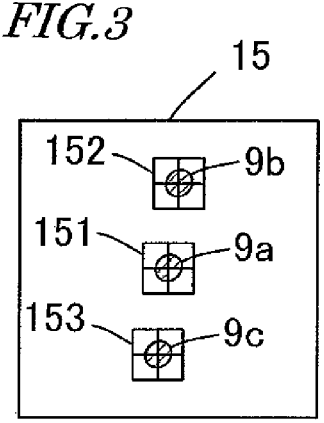
FIG. 3 A diagram showing the construction of a photodetector 15.

FIG. 3 shows the construction of the photodetector 15. The photodetector 15 includes photodetecting portions 151, 152, and 153. The detected light 9 contains three beams, i.e., a main beam 9a and sub beams 9b and 9c. The main beam 9a enters the photodetecting portion 151, whereas the sub beams 9b and 9c respectively enter the photodetecting portions 152 and 153. An RF signal is generated from the light amount signal of the main beam 9a as detected at the photodetecting portion 151. On the other hand, a focus error signal and a tracking error signal are generated by using, in addition to the light amount signal of the main beam 9a as detected at the photodetecting portion 151, the light amount signals of the sub beams 9b and 9c as respectively detected at the photodetecting portion 152 and the photodetecting portion 153. The principles of detection of the RF signal, the focus error signal, and the tracking error signal are already known, and these detection principles in themselves do not pertain to the essence of the present invention; therefore, the detailed descriptions thereof are omitted.

Figure 4:
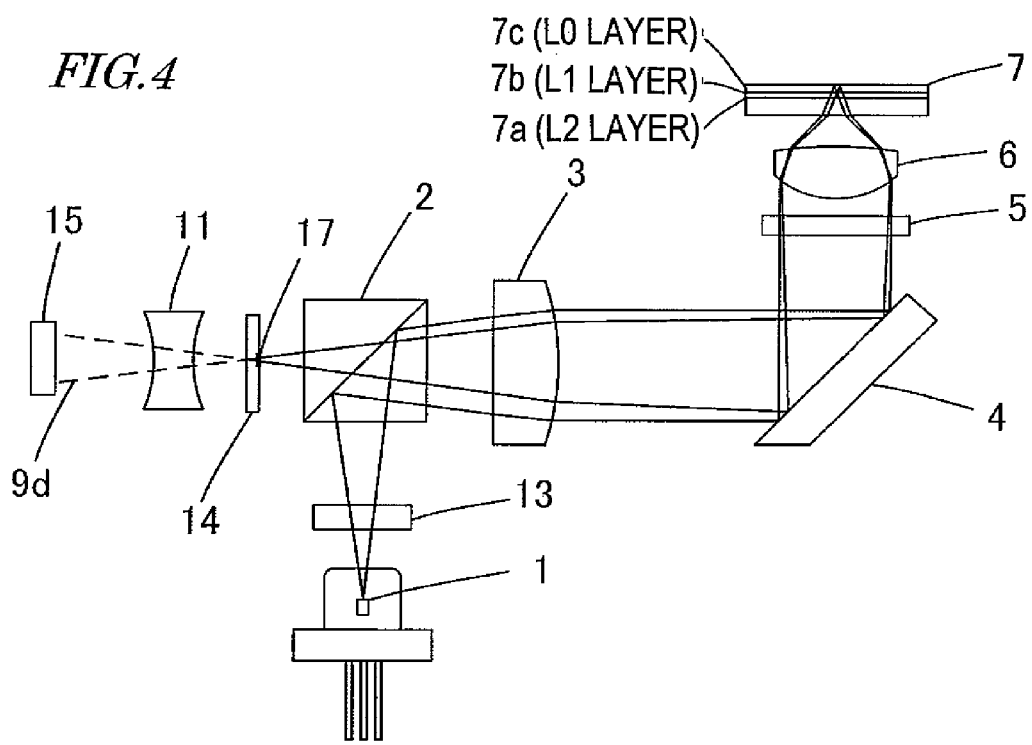
FIG. 4 A diagram showing an optical path of reflected light from a rearward-adjoining L0 layer when light for recording or reproduction of information is converged on an L1 layer.

FIG. 4 shows an optical path of the reflected light from the rearward-adjoining L0 layer when light for recording or reproduction of information is converged on the L1 layer. Light reflected by the L0 layer once converges between the collimator lens 3 and the photodetector 15, and the light shielding member 14 is disposed so that the light shielding portion 17 is located near this point of convergence. Therefore, most light is blocked, so that the reflected light from the L0 layer does not enter the photodetector 15. In other words, the photodetecting portions 151 to 153 are not struck by the reflected light from the L0 layer.

Figure 5:
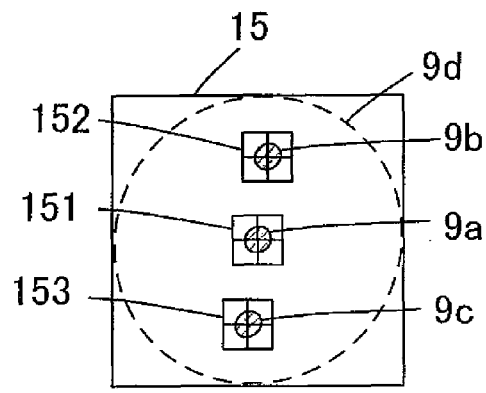
FIG. 5 A diagram showing a main beam 9a and sub beams 9b and 9c entering a photodetector 15.

FIG. 5 shows the main beam 9a and the sub beams 9b and 9c entering the photodetector 15. For reference, reflected light 9d from the L0 layer, which would be incident if it were not for the light shielding portion 17, is shown by a broken line. Since there exists no reflected light 9d, the influences of the reflected light from the L0 layer are removed from any of the RF signal, the focus error signal, and the tracking error signal which are generated from the light amount signals of the main beam 9a and the sub beams 9b and 9c. As a result, the signal quality at the time of reproduction or recording for the multilayer disc can be improved.

Figure 6:
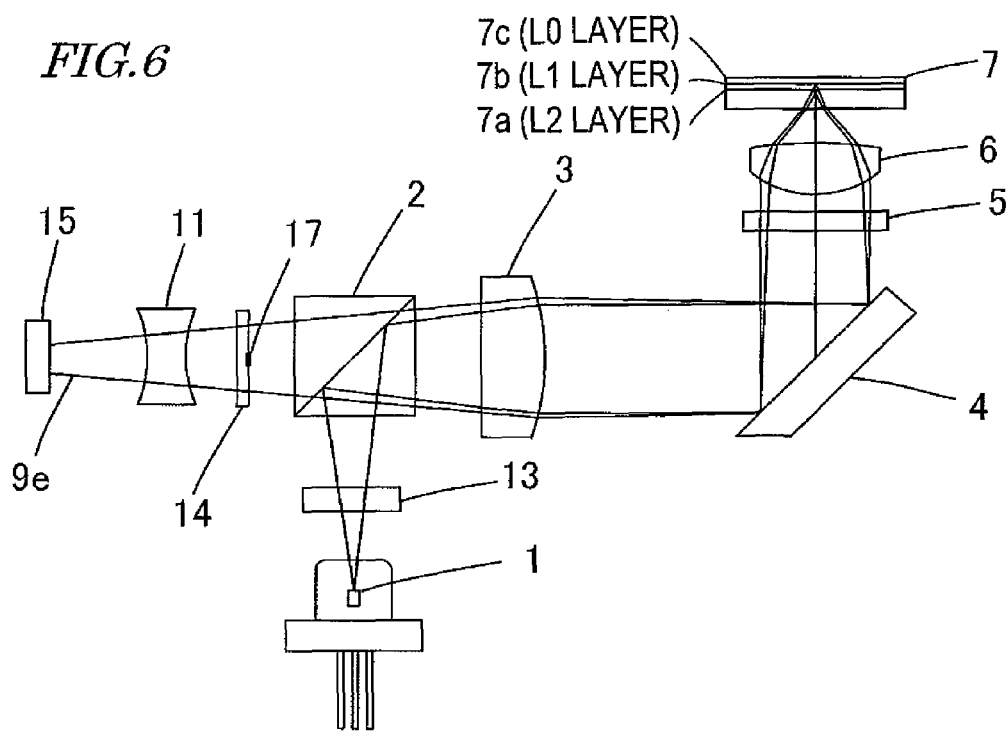
FIG. 6 A diagram showing an optical path of reflected light from a frontward-adjoining L2 layer when light is converged on an L1 layer.

Next, FIG. 6 shows an optical path of the reflected light from the frontward-adjoining L2 layer when light is converged on the L1 layer. A part of the light reflected by the L2 layer is blocked by the light shielding portion 17 of the light shielding member 14, but the rest is transmitted so as to enter the photodetector 15. At this time, it has not become focused at the photodetector 15, and thus enters in a greatly defocused state.

Figure 7:
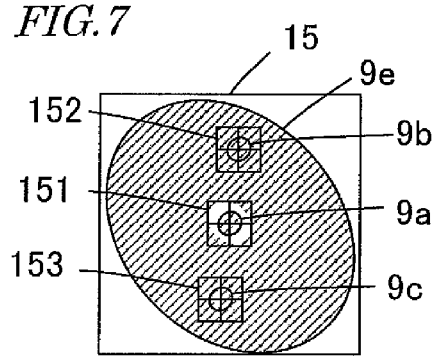
FIG. 7 A diagram showing reflected light 9e from an L2 layer upon a photodetector 15.

FIG. 7 shows the reflected light 9e from the L2 layer upon the photodetector 15. The reflected light 9e is defocused, and has a large expanse over the detection surface of the photodetector 15. As described above, the light in the central portion of the reflected light 9e is blocked by light shielding portion 17 of the light shielding member 14. As a result, much of the reflected light 9e entering the photodetecting portion 151 is removed.

On the other hand, the main beam 9a of the reflected light from the L1 layer, which is the target of recording or reproduction, is partly blocked by the light shielding portion 17, but its remainder becomes focused on the photodetector 15. The light amount of the detected main beam 9a is a sufficient light amount for generating the RF signal and the like. As a result, the signal quality at the time of reproduction or recording for the multilayer disc can be improved.

Next, the position at which the light shielding member 14 is provided and the size of the light shielding portion 17 according to the present embodiment will be described.

Figure 8:
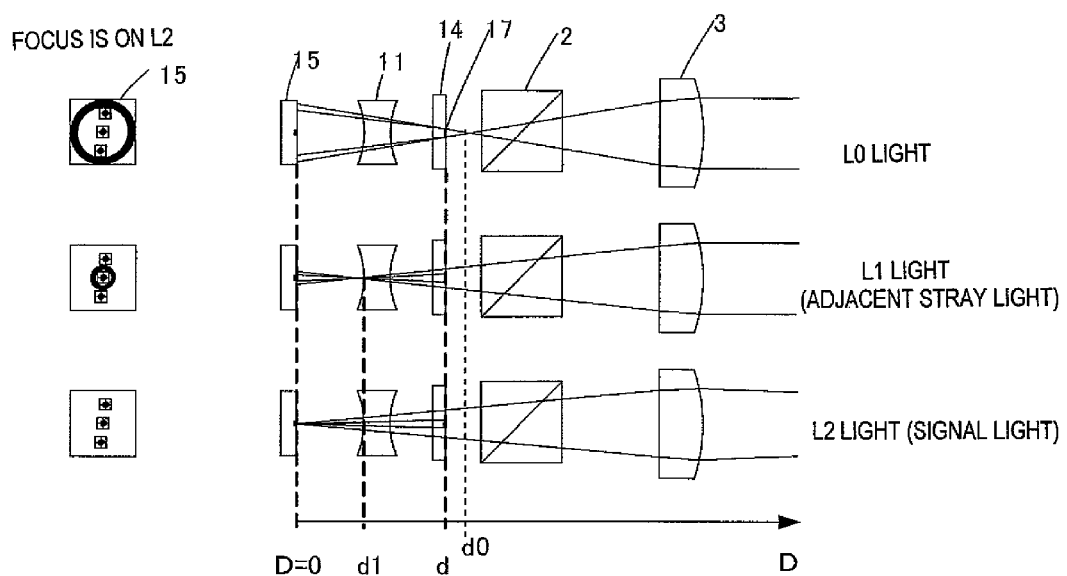
FIG. 8 A diagram showing the respective reflected light from L10, L1, and L2 layers when light is converged on an L2 layer.

FIG. 8 shows the respective reflected light from the L0, L1, and L2 layers when light is converged on the L2 layer. For convenience of description, FIG. 8 illustrates a portion from the collimator lens 3 to the photodetector 15. The same is also true of FIG. 9 and FIG. 10 described below. In FIG. 8 to FIG. 10, by defining the position at which the photodetector 15 is disposed as a reference position 0, the distance from the photodetector 15 is designated as D. Moreover, the distance to the light shielding portion 17 is designated as d. Note that, although the distance D from the photodetector 15 can be measured in terms of a straight line in the example of FIG. 8, it is not necessary that a straight line be employed for measurement. The distance D may be the distance that is experienced by the light, i.e., an optical path length. Therefore, the distance D can still be defined even if traveling directions of the light are changed by mirror or the like.

The reflected light from the L0 layer is converged at a position d0 between the polarization beam splitter 2 and the light shielding member 14, whereas the reflected light from the L1 layer is converged at a position d1 between the cylindrical lens 11 and the photodetector 15. The point of convergence of the reflected light from the L1 layer is closer to the photodetector 15 than is the point of convergence of the reflected light from the L0 layer. That is, d1<d0.

The reflected light from the L2 layer converges on each photodetecting portion on the photodetector 15 as signal light (D=0).

In a multilayer disc, stray light from forward and rearward layers that adjoin a layer from or to which information is to be reproduced or recorded is a major problem; however, stray light from layers which are two or more layers apart is hardly a problem. The reason is that such stray light is very significantly defocused on the photodetector, and that its light amount that is reflected from the disc is smaller than those of adjacent stray light.

Therefore, in the case illustrated in FIG. 8 (a state of being converged on the L2 layer of a three-layered disc), what is particularly problematic is the stray light from the adjoining L1 layer.

FIG. 9 shows the respective reflected light from the L0, L1, and L2 layers when light is converged on the L1 layer. At this time, the reflected light from both the L0 layer and the L2 layer is the problematic adjacent stray light. The reflected light from the L0 layer converges at a position d2 between the light shielding member 14 and the detection lens 11, whereas the reflected light from the L2 layer has not become focused at the photodetector 15, but enters the photodetector 15 in a defocused state.

FIG. 10 shows the respective reflected light from the L0, L1, and L2 layers when light is converged on the L0 layer. At this time, the reflected light from the L1 layer is the problematic adjacent stray light. The reflected light from the L1 layer has not become focused at the photodetector 15, but enters the photodetector 15 in a defocused state. The reflected light from the L2 layer enters the photodetector 15 in a more defocused state than the reflected light from the L1 layer.

Now, an example where the optical parameters of the respective constituent elements of the optical pickup device 100 are set as follows will be described. That is, the objective lens 6 has a focal length f1=1.3 and a numerical aperture NA=0.85, and the collimating lens 3 and the detection lens 11 have a combined focal length consisting of the collimator lens 3 and the detection lens 11 (not including cylindrical surface) is f2=14.

Figure 11:
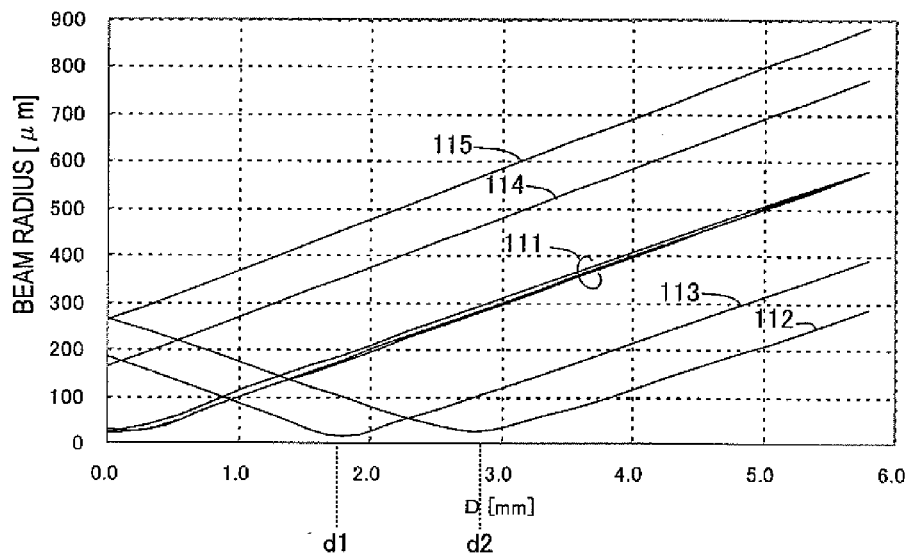
FIG. 11 A diagram showing results of plotting a beam radius on the vertical axis, where the distance D from the photodetector surface is taken on the horizontal axis.

FIG. 11 shows results of plotting a beam radius on the vertical axis, where the distance D from the photodetector surface is taken on the horizontal axis. Hereinafter, reflected light from an LY layer when light is converged on an LX layer will be denoted as "LX-LY light". For example, "L1-L2 light" means the reflected light from the L2 layer when light is converged on the L1 layer. Moreover, "L1-L1 light" means the reflected light from the L1 layer when light is converged on the L1 layer. In the present specification, "LX-LX light" may also be referred to as "light from the converged layer" (light from a focused layer) or "signal light". A "converged layer" (a focused layer) refers to a recording layer on which the focal point of light ascribable to the objective lens 6 exists.

In FIG. 11, light 111 from the converged layer (L2-L2 light, L1-L1 light, L0-L0 light) exists in three that are substantially overlapping, and converges upon the photodetector surface D=0. The L1-L0 light 112 converges near D=d2=2.9 mm, whereas the L2-L1 light 113 converges near D=d1=1.8 mm. By assuming a position D=d at which to dispose the light shielding portion 17 in this example, preferable points will be discussed.

Figure 12:
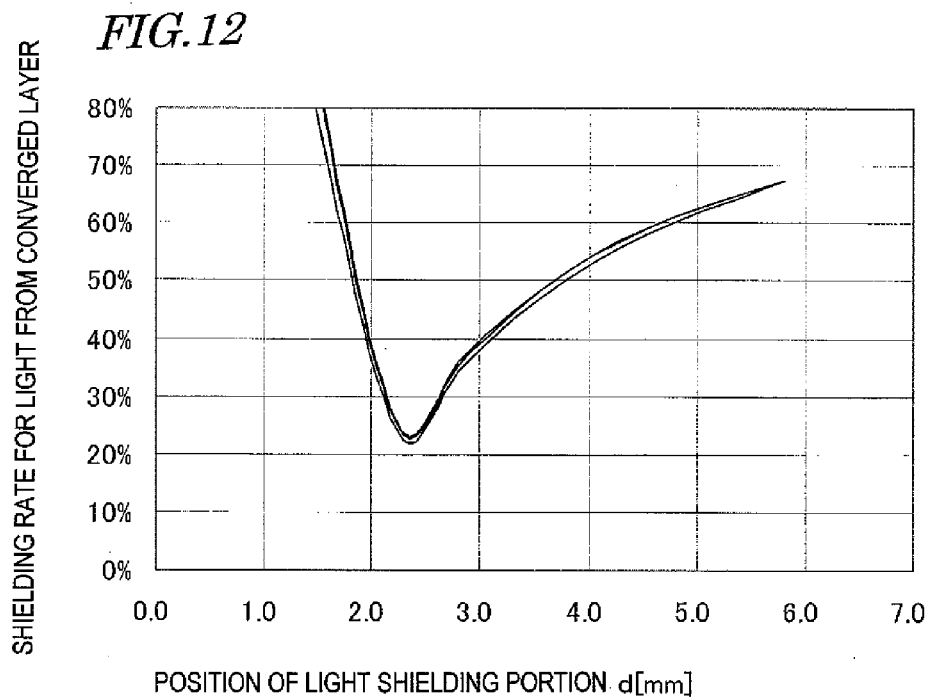
FIG. 12 A diagram showing, in the case where a minimum-sized light shielding portion 17 for completely blocking L1-L0 light and L2-L1 light is disposed, results of plotting a shielding rate for light from a converged layer (radius of the light shielding portion/radius of light from the converged layer), where the position d at which to dispose the light shielding portion is taken on the horizontal axis.

FIG. 12 shows, in the case where a minimum-sized light shielding portion 17 for completely blocking L1-L0 light and L2-L1 light is disposed, results of plotting a shielding rate for light from the converged layer (radius of the light shielding portion/radius of light from the converged layer), where the position d at which to dispose the light shielding portion is taken on the horizontal axis. It can be said that the size of the light shielding portion 17 decreases as the shielding rate for light from the converged layer decreases.

According to FIG. 12, on the premise that L1-L0 light and L2-L1 light are to be completely blocked, the position of the light shielding portion 17 that can minimize the shielding rate for light from the converged layer is near d=2.2 mm. The d herein can be approximated to be d=2×d1×d2/(d1+d2).

Figure 13:
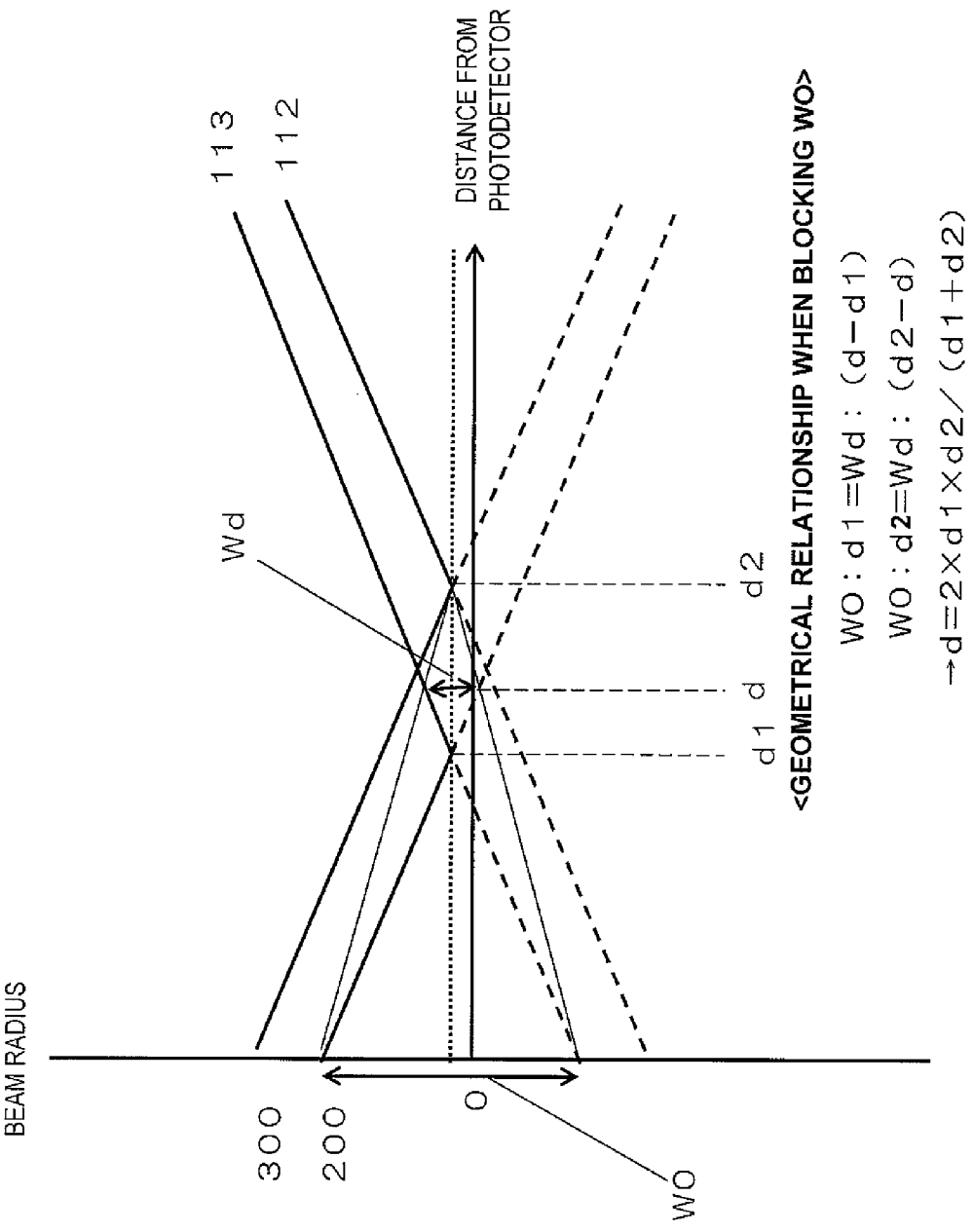
FIG. 13 A diagram showing, in disposing a light shielding member, a position that can minimize the light shielding member while blocking reflected light 112 and reflected light 113.

Hereinafter, it will be described with reference to FIG. 13 how the aforementioned approximation equation is derived. FIG. 13 shows, in disposing a light shielding member, a position that can minimize the light shielding member while blocking the reflected light 112 and the reflected light 113. The geometrical relationship of FIG. 13 is explained by using the data of FIG. 11.

For example, in order to block the W0 region of the photodetector 15, Wd may be blocked in a position at the distance d. At this time, the following relationship holds true.

$W0:d1=Wd:(d-d1)$ $W0:d2=Wd:(d2-d)$

By thus defining d and Wd, the aforementioned proportions are established from the geometrical relationship shown in FIG. 13. These proportions are solved to give d=2×d1×d2/(d1+d2).

However, in the construction of an actual optical pickup device 100, various physical constraints may make it impossible to dispose the light shielding member at the position d=2×d1×d2/(d1+d2).

When FIG. 12 is considered to see if any preceding or succeeding position might not be appropriate, it can be seen that the shielding rate for light from the converged layer drastically increases at d<2.2 mm, while the shielding rate for light from the converged layer has a gentle increase at d>2.2 mm. Therefore, it is preferable that the position d at which to dispose the light shielding portion is d=>2×d1×d2/(d1+d2).

By placing the light shielding portion at such positions, it becomes possible to completely block two of the four kinds of adjacent stray light, while reducing losses due to blocking light from the converged layer. The L0-L1 light and L1-L2 light partly enter the photodetecting portion, but the light in the central portion, where there is an intensive light amount, is similarly blocked by the light shielding portion 17; therefore, a reduction in the noises on the RF signal and focus error signal generated from the main beam photodetecting portion 151 is expectable. From these, the present construction can provide for an improved recording/reproduction performance of a multilayer disc.

Next, a construction which blocks only the portion that enters the main beam photodetecting portion 151, rather than completely blocking the L1-L0 light and the L2-L1 light, will be described.

Figure 14:
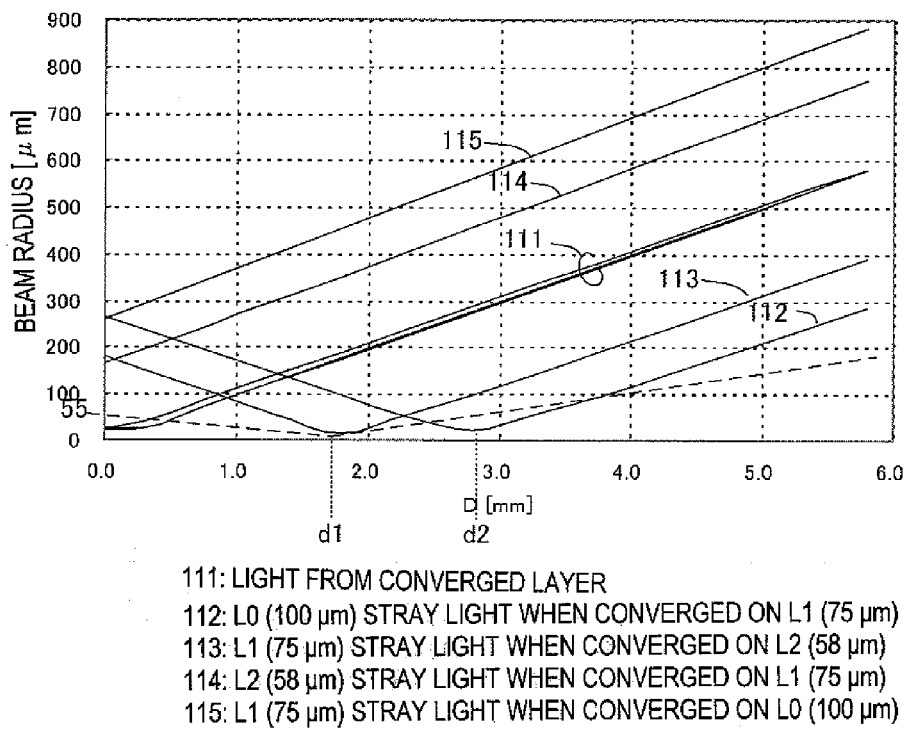
FIG. 14 A diagram showing the size of a light shielding portion that is necessary for blocking a region with a radius of 55 μm from L2-L1 light 113 at a point D=0.

From FIG. 11, the radius of the L2-L1 light 113 at a point D=0 is about 190 μm. Assuming that the photodetecting portion 151 has a size of 110 μm square, stray light from other layers entering the photodetecting portion 151 can be removed by blocking only the region with a beam radius of 55

μm or less at a point D=0. With a dotted line, FIG. 14 shows the size of a light shielding portion that is necessary for blocking a region with a radius of 55 μm from the L2-L1 light 113 at a point D=0. Table 1 below shows the shielding rates for the L1-L0 light 112 and the L2-L1 light 113 when a light shielding portion of a size shown by this dotted line is disposed, as well as a shielding radius at a point D=0.

TABLE 1

| position d of light shielding portion [mm] | L2-L1 light shielding rate [%] | L1-L0 light shielding rate [%] | shielding radius for L2-L1 light at D = 0 [μm] | shielding radius for L1-L0 light at D = 0 [μm] |
|---|---|---|---|---|
| 5.8 | 36% | 49% | 55 | 118 |
| 5.3 | 36% | 52% | 55 | 124 |
| 4.8 | 36% | 55% | 55 | 132 |
| 4.3 | 36% | 61% | 55 | 146 |
| 3.8 | 36% | 73% | 55 | 174 |
| 3.3 | 36% | 90% | 55 | 215 |
| 2.8 | 36% | 153% | 55 | 366 |
| 2.3 | 36% | 37% | 55 | 88 |
| 1.8 | 36% | 5% | 55 | 11 |
| 1.3 | 36% | 14% | 55 | 33 |
| 0.8 | 36% | 19% | 55 | 47 |
| 0.3 | 36% | 23% | 55 | 55 |

The shielding rate for the L2-L1 light and the shielding radius at D=0 are constant, but the values of the shielding rate for the L1-L0 light and the shielding radius at D=0 will change depending on the position d at which the light shielding portion 17 is provided. It can be seen from Table 1 that the shielding radius for the L1-L0 light at D=0 exceeds 55 μm in the region d>2.3, thus indicative that the photodetecting portion 151 is not struck by the L1-L0 light. Table 1 shows results when the size of the photodetecting portion 151 is 110 μm square. Table 2 shows results when the size of the photodetecting portion 151 is 140 μm square.

TABLE 2

| position d of light shielding portion [mm] | L2-L1 light shielding rate [%] | L1-L0 light shielding rate [%] | shielding radius for L2-L1 light at D = 0 [μm] | shielding radius for L1-L0 light at D = 0 [μm] |
|---|---|---|---|---|
| 5.8 | 46% | 63% | 70 | 150 |
| 5.3 | 46% | 66% | 70 | 157 |
| 4.8 | 46% | 70% | 70 | 168 |
| 4.3 | 46% | 78% | 70 | 186 |
| 3.8 | 46% | 92% | 70 | 221 |
| 3.3 | 46% | 114% | 70 | 273 |
| 2.8 | 46% | 195% | 70 | 466 |
| 2.3 | 46% | 47% | 70 | 111 |
| 1.8 | 46% | 6% | 70 | 15 |
| 1.3 | 46% | 17% | 70 | 41 |
| 0.8 | 46% | 25% | 70 | 59 |
| 0.3 | 46% | 29% | 70 | 70 |

In this case, too, the shielding radius for the L1-L0 light at 0=0 exceeds 70 μm in the region d>2.3, thus indicative that the photodetecting portion 151 is not struck by the L1-L0 light.

Generally speaking, the size of the photodetecting portion 151 is on the order of 100 μm square to 150 μm square. Therefore, by setting the shielding rate for the L2-L1 light to be essentially 50% or less, and d>d1, the main beam photodetecting portion can be prevented from being struck by the L1-L0 light and the L2-L1 light.

In other words, according to Tables 1 and 2, by adopting a construction for shielding the photodetecting portion 151 with a predetermined rate of shielding for the L2-L1 light in the range d>d1, it also becomes possible to achieve a required range of shielding for the L1-L2 light as well.

Figure 15:
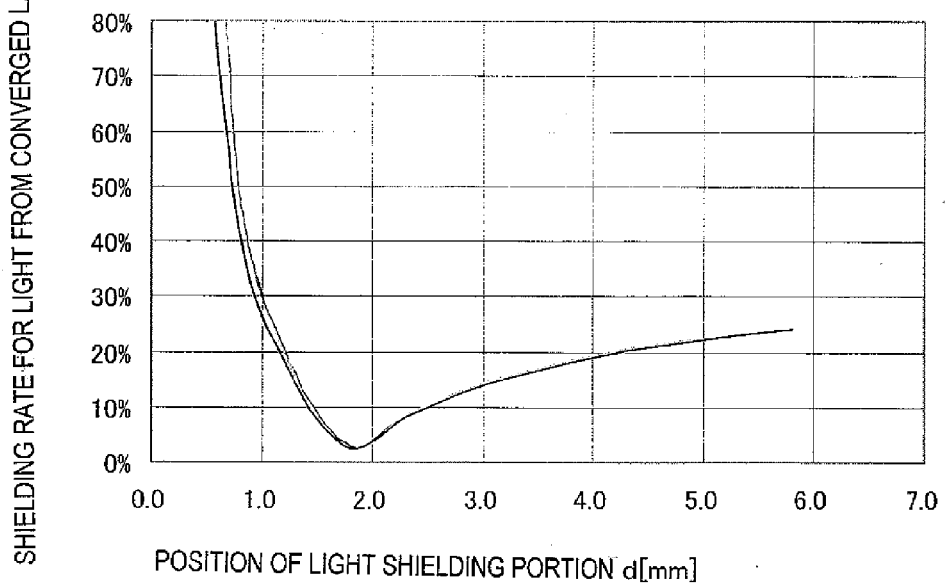
FIG. 15 A diagram showing results of plotting a shielding rate for light from a converged layer in the construction shown in Table 1, where the position d at which to dispose a light shielding member 14 or a light shielding portion 17 is taken on the horizontal axis.

FIG. 15 shows results of plotting a shielding rate for light from the converged layer in the construction shown in Table 1, where the position d at which to dispose the light shielding member 14 or the light shielding portion 17 is taken on the horizontal axis. It can be seen that the shielding rate for light from the converged layer is greatly reduced from FIG. 12. With this construction, since the photodetecting portions for the sub beams are struck by the L1-L0 light and the L2-L1 light, the tracking error signal will contain influences of stray light from other layers. However, as for the main beam, the L1-L0 light and the L2-L1 light are not incident, and as for the L0-L1 light and L1-L2 light, the light in the central portion, where there is an intensive light amount, is blocked by the light shielding portion 17; therefore, noises on the RF signal and focus error signal generated from the light amount signal of the main beam as detected by the photodetecting portion 151 are greatly reduced. Therefore, the present construction makes it possible to provide an optical pickup suitable for recording/reproduction for a multilayer disc, which removes stray light noises from other layers on the RF signal and the focus error signal, and which reduces losses (loss of RF signal information) due to blocking light from the converged layer.

Embodiment 2

In Embodiment 1, a light shielding portion is provided on the light shielding member to block reflected light from other layers so as not to enter the photodetector.

In the present embodiment, a diffraction element is further employed to diffract all or much of the reflected light from the other layers so as not to enter each photodetecting portion on the photodetector.

Figure 16:
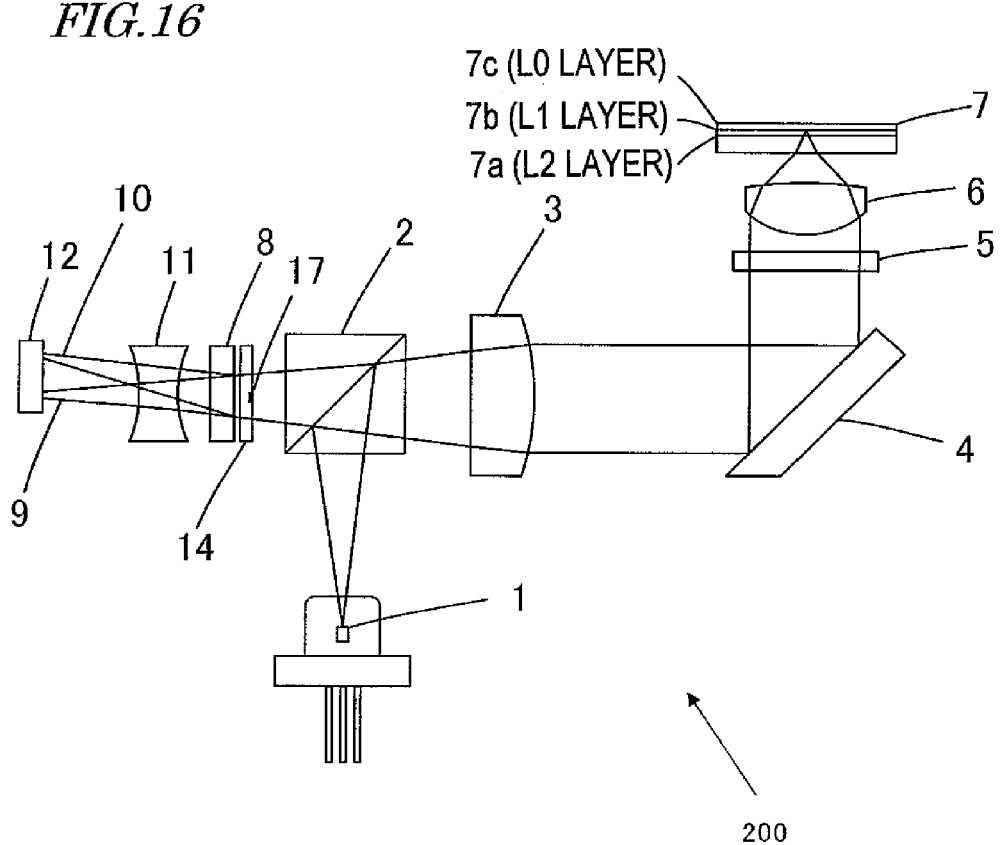
FIG. 16 A diagram showing the construction of an optical pickup device 200 according to Embodiment 2 of the present invention.

FIG. 16 shows the construction of an optical pickup device 200 according to the present embodiment.

The optical pickup device 200 of the present embodiment is composed by adding a diffraction element 8 to the optical pickup device 100 of Embodiment 1. Hereinafter, the construction concerning the diffraction element 8 will be described.

First, light which is emitted from a semiconductor laser 1 as a light source is reflected by a polarization beam splitter 2, and converted to a substantially parallel light beam by a collimating lens 3. This parallel light beam is reflected by a mirror 4, transmitted through a wavelength plate 5, and converged by an objective lens 6 onto an optical disc 7 as a storage medium. FIG. 16 shows an optical path of light which is converged on an L1 layer.

The reflected light from the L1 layer reaches the polarization beam splitter 2 through an opposite path. At this point, due to the action of the wavelength plate 5, the polarization state of the reflected light has been converted to a state which is different from the polarization state in the forward path; therefore, much of the light reaching the polarization beam splitter 2 is transmitted so as to enter the light shielding member 17.

As was described in Embodiment 1, rather than blocking all of the L1-L0 light and the L2-L1 light, the light shielding portion 17 is set to a size for blocking only portions thereof that overlap the main beam ($0^{th}$ order light) entering a photodetecting portion 121. For example, as has been described in connection with Table 1 and Table 2, the light shielding portion 17 is sized so that the shielding rate for the L2-L1 light is essentially 50% or less.

When passing through the light shielding member 17, the light is blocked in the central portion by the light shielding portion 17, and enters the diffraction element 8. In the present embodiment, the $0^{th}$ order light 9 which is not diffracted by the diffraction element 8 (referred to as the "main beam 9" in the present embodiment) moves straight, and passes through the cylindrical lens 11 to enter the photodetector 12. On the other hand, diffracted light 10 which has been diffracted by the diffraction element 8 (referred to as a "sub beam 10" in the present embodiment) strikes different positions on the photodetector 12 from the main beam 9.

Figure 17:
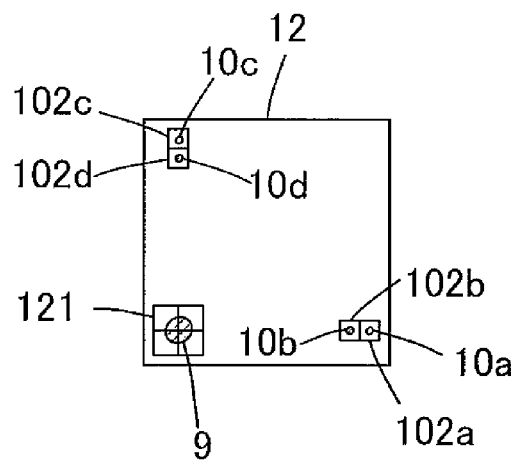
FIG. 17 A diagram showing the construction of a photodetector 12 according to Embodiment 2.

FIG. 17 shows the construction of the photodetector according to the present embodiment. The main beam 9 enters the four-divided photodetecting portion 121. From the light amount signal of the main beam 9 as detected by the photodetecting portion 121, an RF signal and on a focus error signal based on the astigmatic method are generated. The sub beam 10 contains four beams 10a, 10b, 10c, and 10d which are split corresponding to regions which are provided in the diffraction element 8. The four beams 10a, 10b, 10c, and 10d respectively enter the photodetecting portions 102a, 102b, 102c, and 102d. A tracking error signal is generated by using light amount signals respectively detected by the photodetecting portions 102a, 102b, 102c, and 102d.

Figure 18:
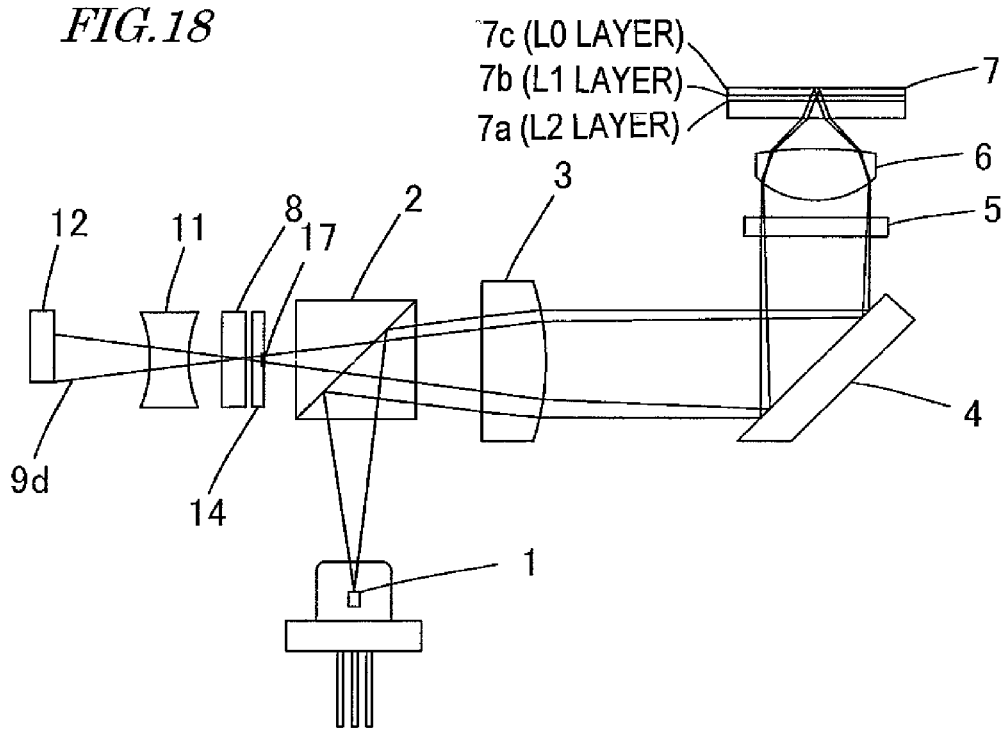
FIG. 18 A diagram showing an optical path of reflected light from a rearward-adjoining L0 layer when light is converged on an L1 layer.

FIG. 18 shows an optical path of reflected light from the rearward-adjoining L0 layer when light is converged on the L1 layer. Light reflected by the L0 layer once becomes focused between the collimator lens 3 and the photodetector 12, and enters the photodetector 12 in a greatly defocused state.

Figure 19:
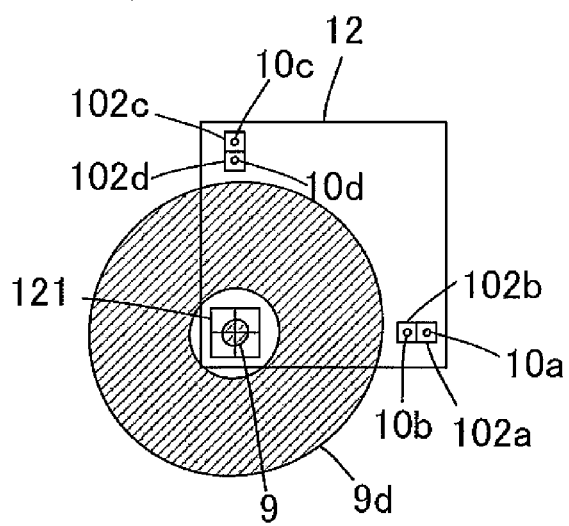
FIG. 19 A diagram showing reflected light 9d from an L0 layer upon a photodetector 12.

FIG. 19 shows reflected light 9d from the L0 layer upon the photodetector 12.

Since the reflected light 9d is defocused, it spreads over a much larger range than the photodetecting portion 121. However, the photodetecting portions 102a to 102d for detecting light amount signals to be used for generating the tracking error signal are disposed outside the reflected light 9d, and therefore are not struck by the reflected light 9d. Therefore, the tracking error signal is not affected by reflected light from the adjoining rear recording layer. Moreover, as has been described in Embodiment 1, the light shielding portion 17 is set to a size for blocking only portions that overlap the main beam ($0^{th}$ order light) entering the photodetecting portion 121, rather than blocking all of the L1-L0 light and the L2-L1 light. Therefore, the construction of the present embodiment realizes a construction in which all photodetecting portions are prevented from being struck by the L1-L0 light and the L2-L1 light.

Figure 20:
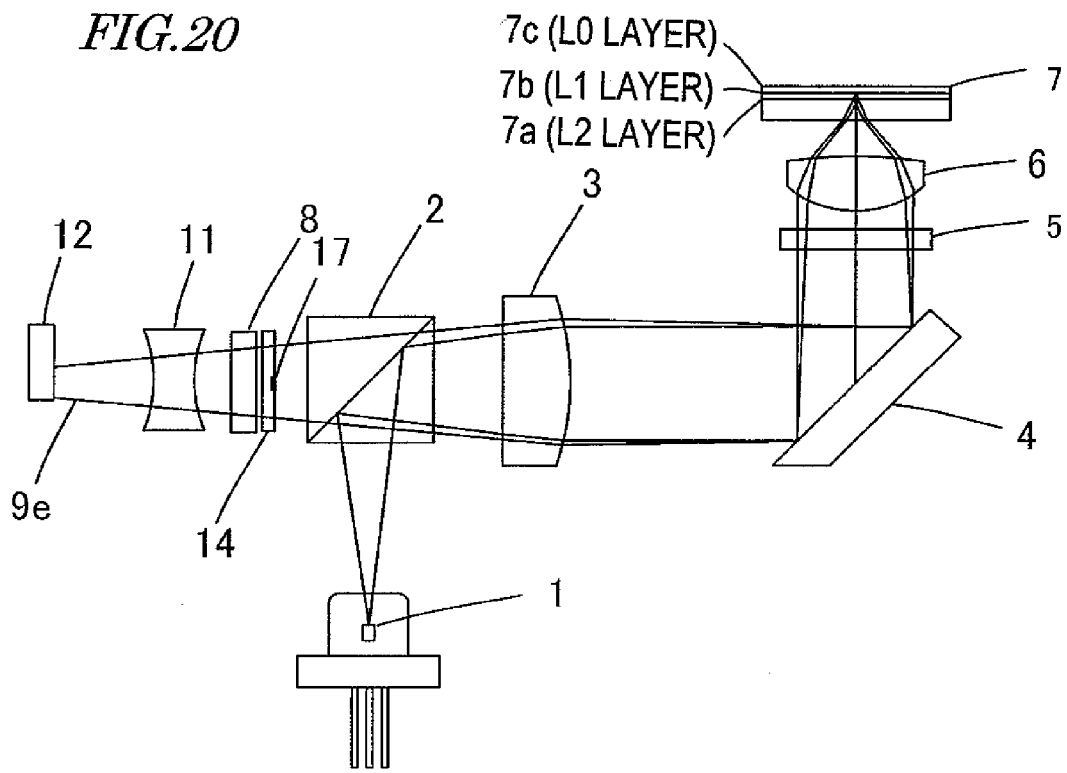
FIG. 20 A diagram showing behavior of reflected light from a frontward-adjoining L2 layer when light is converged on an L1 layer.

FIG. 20 shows the behavior of reflected light from the frontward-adjoining L2 layer when light is converged on the L1 layer. The light reflected by the L2 layer has not converged at the photodetector 12 yet, but enters the photodetector 12 in a greatly defocused state.

Figure 21:
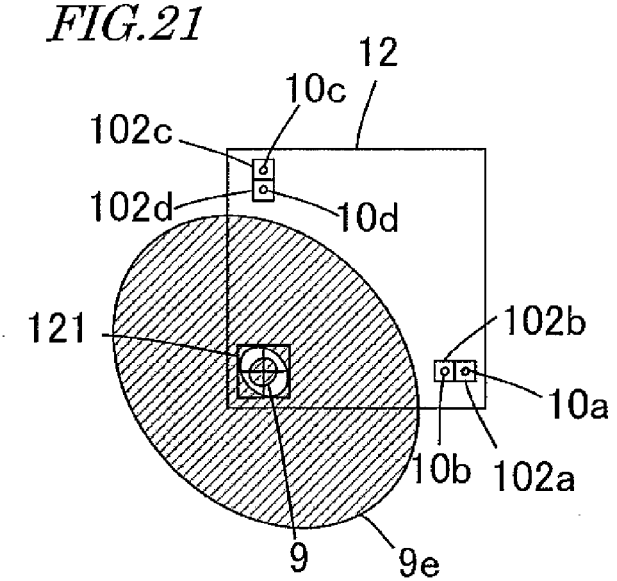
FIG. 21 A diagram showing reflected light 9e from an L2 layer upon a photodetector 12.

FIG. 21 shows reflected light 9e from the L2 layer upon the photodetector 12.

Since the reflected light 9e is defocused, it spreads over a much larger range than the photodetecting portion 121. However, the photodetecting portions 102a to 102d for detecting light amount signals which are used for generating the tracking error signal are disposed outside the reflected light 9e, and therefore are not struck by the reflected light 9e. Thus, the tracking error signal is not affected by reflected light from the adjoining frontward recording layer. The L0-L1 light and L1-L2 light partly enter the photodetecting portion 121, but the light in the central portion, where there is an intensive light amount, is similarly blocked by the light shielding portion 17; therefore, the noises on the RF signal and the focus error signal are greatly reduced. Thus, with the present construction, a high-performance optical pickup can be realized in which the influences from the stray light from other layers are removed or greatly reduced for all of the RF signal, the focus error signal, and the tracking error signal.

Although the light shielding member 17 and the diffraction element 8 are illustrated as independent members herein, the two can be composed as an integral piece. This provides for simplification and cost-reduction of the optical pickup device.

The present example illustrates a construction in which the diffraction element 8 directs the light from which to generate the tracking error signal toward a photodetecting portion that is disposed outside the region which is struck by stray light from other layers. However, even with the three-beam approach construction described in Embodiment 1, the photodetecting portions 152 and 153 may be disposed outside the region which is struck by stray light from other layers, and the grating pitch of the diffraction grating 13 may be adapted to the positions of the photodetecting portions 152 and 153, whereby effects similar to those of the present example can be expected.

Although it has been illustrated that the diffraction element 8 diffracts a part of the light from the converged layer but does not diffract a part thereof, this is an example. Both of the main beam and the sub beams can be diffracted so long as they are made to strike positions such that stray light from other layers are not received.

Embodiment 3

In Embodiment 2, a light shielding portion and a diffraction element are employed to eliminate influences of stray light by providing photodetecting portions of the photodetection section at positions which are not struck by stray light from other layers.

In the present embodiment, a wavelength plate which changes the polarization state of incident light depending on its incident region is employed, and the polarization state of stray light from other layers is taken advantage of so as not to allow the stray light to enter the photodetector, while allowing light from the converged layer to enter the photodetector by taking advantage of its own polarization state.

Figure 22:
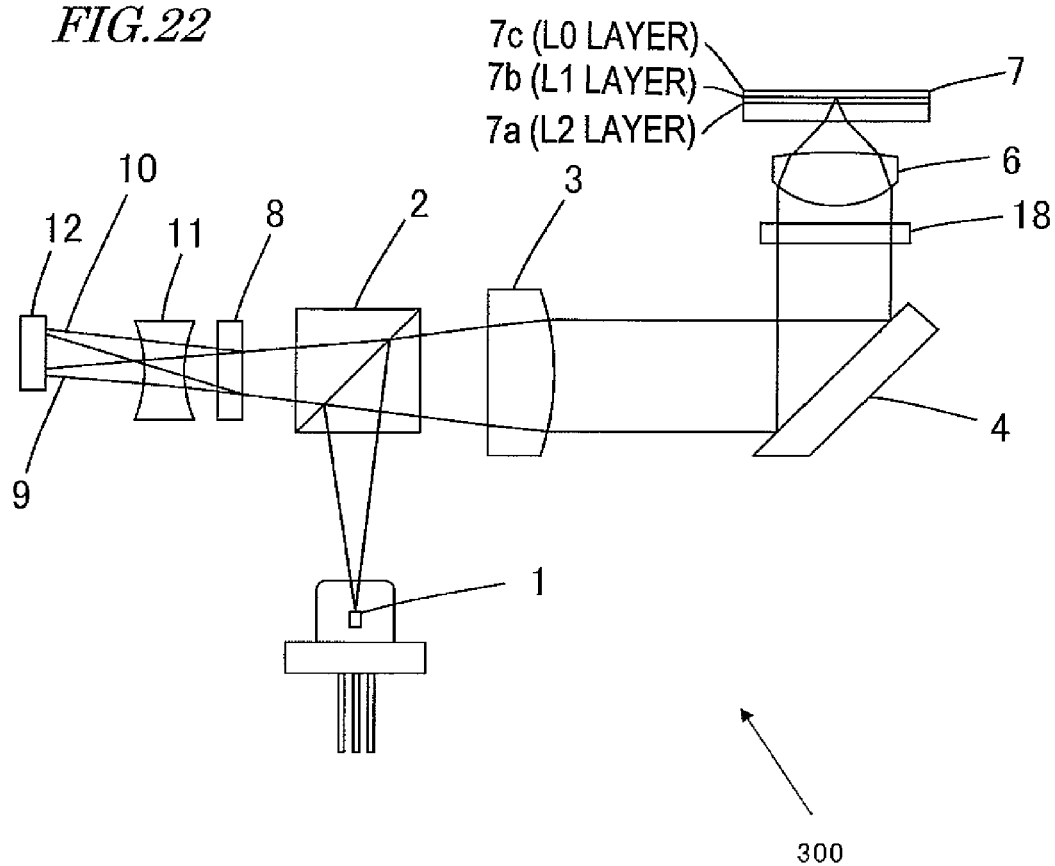
FIG. 22 A diagram showing the construction of an optical pickup device 300 according to Embodiment 3 of the present invention.

FIG. 22 shows the construction of an optical pickup device 300 according to the present embodiment.

Light which is emitted from a semiconductor laser 1 as a light source is reflected by a polarization beam splitter 2, and converted to a substantially parallel light beam by a collimator lens 3. This parallel light beam is reflected by a mirror 4, transmitted through a wavelength plate 18, and converged by an objective lens 6 onto an optical disc 7. FIG. 22 shows an optical path of light which is converged on an L1 layer.

Figure 23:
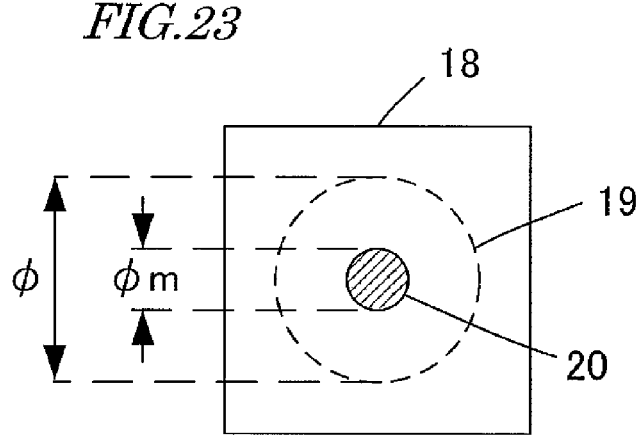
FIG. 23 A diagram showing a diameter φ of an entire beam 19 passing through a wavelength plate 18 and a diameter φm of a central portion 20.

Light which is transmitted through the wavelength plate 18 has its polarization state converted by the wavelength plate 18. Between a central portion 20 (a central region containing the optical axis) and any other region (the peripheral region surrounding the outside of the central portion 20) of the wavelength plate 18, either the optic axis azimuth or the phase difference differs. Thus, depending on the region of the wavelength plate 18, through which the light is passed, the manner of polarization state conversion (amount of polarization state conversion) differs. In the present embodiment, as shown in FIG. 23, the diameter of an entire beam 19 passing through the wavelength plate 18 is defined as φ, and the diameter of the central portion 20 as φm. In the present embodiment, the φm region 20 of the central portion 20 is formed so as to cause no phase difference with respect to the light or to be a λ/2 wave plate, whereas the region other than the central portion 20 is formed so as to become a λ/4 wavelength plate.

The reflected light from the L1 layer reaches the polarization beam splitter 2 through an opposite path. At this time, the reflected light transmitted through the region other than the central portion 20 of the wavelength plate 18 (λ/4 wavelength plate region) is converted to linearly polarized light whose polarization azimuth is orthogonal to that in the forward path, after having passed through the return path. As a result, much of the light reaching the polarization beam splitter 2 is transmitted so as to enter a diffraction element 8. Within the light entering the diffraction element 8, the undiffracted $0^{th}$ order light (main beam 9) moves straight, and passes through the cylindrical lens 11 to enter the photodetector 12. On the other hand, the diffracted light (sub beam 10) which has been diffracted by the diffraction element 8 strikes different positions on the photodetector 12 from the detected light 9.

On the other hand, even after passing through the return path, the reflected light transmitted through the central portion 20 (zero phase difference, or λ/2 plate region) retains the same polarization state as that in the forward path, and thus, at the polarization beam splitter 2, the return-path light undergoes substantial total reflection in the direction of the light source 1.

In the present embodiment, the central portion 20 may be formed so as to present a phase difference of 0 to λ/4, or λ/4 to λ/2, and the relative phase difference from the region other than the central portion 20 may take a value between 0 and λ/4 in a single path. In this manner, the problem of wave aberration caused by a refractive index difference between the central portion 20 and the region other than the central portion 20 can be made less likely to occur. At this time, the return-path light in the region of the central portion 20 begins to be transmitted through the polarization beam splitter 2, but with a transmittance which can be made smaller than the transmittance when return-path light in the region other than the central portion 20 is transmitted through the polarization beam splitter 2.

The construction of the photodetector 12 and its photodetection operation are similar to those described with reference to FIG. 17 in Embodiment 2. FIGS. 24(a) to (c) show sizes on the wavelength plate 18 when the photodetecting portion 121 is struck by L1-L1 light, L1-L0 light, and L1-L2 light when light is converged on the L1 layer.

FIG. 24(a) shows L1-L1 light (light from the converged layer) 21 entering the wavelength plate 18. Since the entire beam of L1-L1 light 21 excluding the central portion 20 enters the photodetecting portion 121, the size of the light from the converged layer and the size of the beam entering the photodetecting portion 121 are equal.

FIG. 24(b) shows a region 22 on the wavelength plate 18. The L1-L0 light entering the region 22 strikes the photodetecting portion 121. However, since the L1-L0 light once converges before entering the photodetector 12, it is greatly defocused on the photodetector 12. Therefore, on the wavelength plate 18, the region 22 is much smaller than a region 21 which is struck by the light from the converged layer.

FIG. 24(c) shows a region 23 on the wavelength plate 18. The L1-L2 light entering the region 23 strikes the photodetecting portion 121. However, since the L1-L2 light is also defocused on the photodetector 12, on the wavelength plate 18, the region 23 is smaller than the region 21 which is struck by the light from the converged layer.

Table 3 shows proportions which the sizes of the respective stray light from other layers entering the photodetecting portion 121 account for in the size of the light from the converged layer, on the wavelength plate 18. Table 4 shows proportions which the sizes of the respective stray light from other layers entering the photodetecting portion 121 account for in the light from the converged layer, in the case where a light shielding member is provided in the optical path between the photodetector 12 and the collimator lens 3 as in the constructions described in Embodiment 1 and Embodiment 2.

TABLE 3

| L2-L1 light | L1-L0 light | L1-L2 light | L0-L1 light | maximum |
|---|---|---|---|---|
| 24% | 17% | 25% | 17% | 25% |

TABLE 4

| d [mm] | L2-L1 light | L1-L0 light | L1-L2 light | L0-L1 light | maximum |
|---|---|---|---|---|---|
| 5.8 | 24% | 11% | 38% | 29% | 38% |
| 5.3 | 23% | 10% | 39% | 29% | 39% |
| 4.8 | 22% | 9% | 40% | 30% | 40% |
| 4.3 | 21% | 8% | 41% | 31% | 41% |
| 3.8 | 19% | 6% | 42% | 33% | 42% |
| 3.3 | 16% | 4% | 44% | 34% | 44% |
| 2.8 | 13% | 2% | 47% | 37% | 47% |
| 2.3 | 9% | 5% | 51% | 40% | 51% |
| 1.8 | 3% | 13% | 57% | 45% | 57% |
| 1.3 | 16% | 26% | 68% | 54% | 68% |
| 0.8 | 49% | 58% | 92% | 73% | 92% |
| 0.3 | 204% | 204% | 204% | 138% | 204% |

In the case where there are three recording layers, there exist four types of adjacent stray light to be removed, as indicated in Table 4. In order to remove the four kinds of adjacent stray light, it is necessary to set a region corresponding to the stray light from another layer. The size of the region is equal to that of the largest stray light among the four upon the plane. Therefore, Table 3 and Table 4 above show the proportions which the maximum sizes among the four kinds of adjacent stray light account for in the size of the light from the converged layer.

It can be seen from the above Tables that setting the light shielding region upon the wavelength plate 18 keeps the maximum size among the four kinds of adjacent stray light smaller. Therefore, as Table 3 indicates, based on diameter ratio of about 25% with respect to the light from the converged layer, it may be ensured that the amount of polarization state conversion for the light passing through the region of the central portion differs from that of the other region; as a result of this, with respect to all of the four kinds of adjacent stray light, stray light from other layers can be prevented from entering the photodetecting portion 121. Then, by disposing the photodetecting portions 102a, 102b, 102c, and 102d for receiving the tracking error signal at positions away from the beam center, which are not struck by stray light from other layers as described in Embodiment 2, influences of all adjacent stray light are eliminated. Thus, in accordance with the present construction, it becomes possible to completely eliminate the influences of adjacent stray light in all photodetecting portions upon the photodetector 12. This realizes a very stable and high-performance optical pickup device which is free from the influences of noises due to stray light from other layers at the time of recording or reproduction for a multilayer disc.

As indicated in the present example, in the case where a light shielding region is set on the wavelength plate 18, the wavelength plate 18 may be disposed in an objective lens actuator, thereby allowing the member for setting a light shielding region to be moved integrally with the objective lens. This makes it possible to for the light shielding region to be always maintained at the beam center even when the objective lens is laterally shifted during a tracking operation, thus providing an excellent advantage in that the effects of removing stray light from other layers are not lost even when there is a large shift of the objective lens due to tracking, i.e., in the case where recording or reproduction is to be performed for a highly eccentric disc.

Moreover, as shown in Table 3, in this exemplary construction, setting a light shielding region which accounts for 25% in diameter ratio with respect to the light from the converged layer makes it possible to prevent adjacent stray light from entering the photodetecting portion that receives the main beam. This diameter ratio varies depending on the magnification of the optical system (the ratio between the objective lens focal length and a combined focal length of the collimator lens and the detection lens). However, from the standpoint of deteriorations in the quality of reproduction due to shielding losses of light from the converged layer, in the case of shielding the central portion, the size of shielding is preferably kept 30% or less in diameter ratio. If any larger size were to be shielded, influences of missing RF signal components would become outstanding, and problems such as distortion of the reproduction signal and jitter deterioration would become non-negligible, thus possibly detracting from the device performance. Therefore, the light shielding region to be set should be kept 30% or less in diameter ratio of the light from the converged layer; and as for the magnification of the optical system, it is preferable that a magnification be selected such that the light shielding region for preventing adjacent stray light from entering the main beam photodetecting portion is 30% or less in diameter ratio of the light from the converged layer.

Thus, it can be seen from Table 3 and Table 4 that the size of light shielding or attenuation can be made smaller by providing a member for setting a light shielding region (the wavelength plate 18 being one example) between the objective lens and the collimator lens, than by providing a light shielding portion (the light shielding member 14 being one example) between the collimator lens and the photodetector. This ensures that, within the light entering the detection section 151, less signal light is shielded or attenuated.

Embodiment 4

Embodiment 3 illustrates an exemplary construction in which setting of a light shielding or attenuating region and of separation light from other regions are achieved by a combination of: adapting the phase difference of the light and changing the optic axis of a wavelength plate; and a polarization beam splitter. Instead of this wavelength plate, a polarization diffraction grating may be used. An example of such a construction will be described with reference to FIG. 25.

Figure 25:
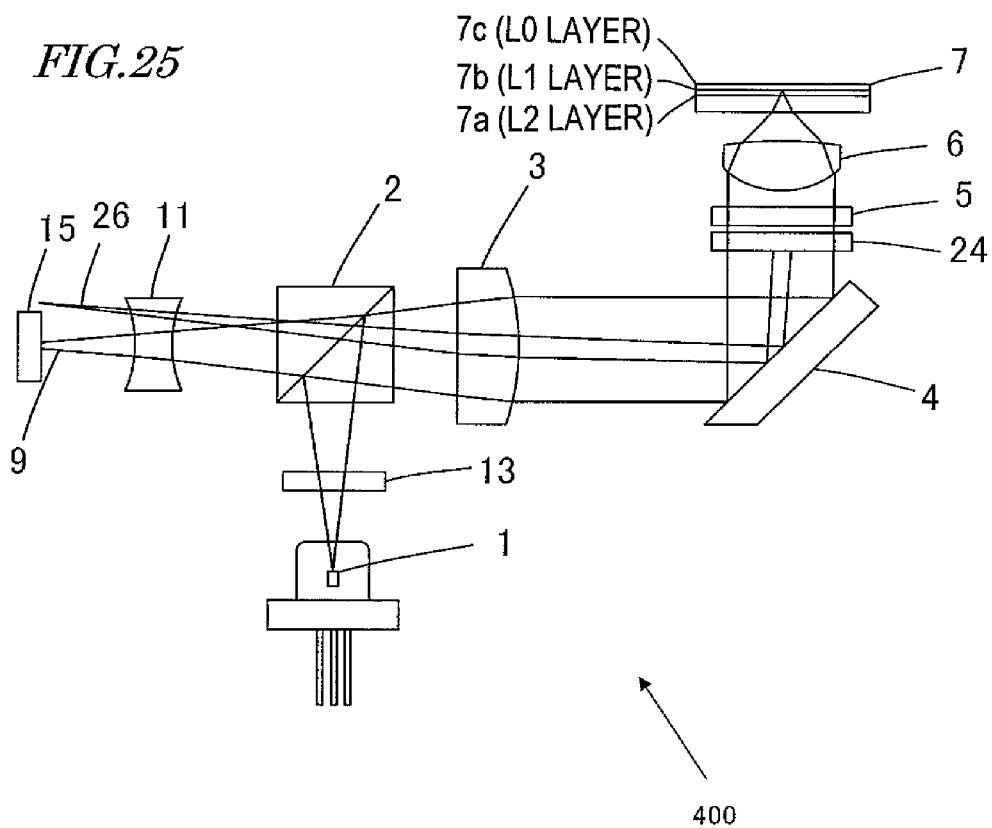
FIG. 25 A diagram showing the construction of an optical pickup device 400 according to Embodiment 4 of the present invention.

FIG. 25 shows the construction of an optical pickup device 400 according to the present embodiment.

Light which is emitted from a semiconductor laser 1 as a light source is transmitted through a diffraction grating 13 for generating three beams, reflected by a polarization beam splitter 2, and converted to a substantially parallel light beam by a collimator lens 3. This parallel light beam is reflected by a mirror 4, transmitted through a polarization-selective diffraction element 24 and a wavelength plate 5, and converged by an objective lens 6 onto an optical disc 7 as a storage medium.

As the polarization-selective diffraction element 24, those of various approaches are already widely available to the public, e.g., polymer materials, photoreactive liquid crystals, and those utilizing the photorefractive effect of an electro-optic crystal such as lithium niobate.

However, in the forward path, the polarization selectivity of the polarization-selective diffraction element 24 is set so as not to exhibit a diffractive action when combined with the polarization state of light.

When light heading toward the storage medium passes through the wavelength plate 5, and thereafter light reflected from the storage medium again passes through the wavelength plate 5, e.g., in the case where the wavelength plate 5 is a ¼ wavelength plate, the polarization state of light after having passed through the return path can be converted to so-called linear polarization, with a polarization direction which is orthogonal to that of the light before passing through the forward path, due to the actions in the forward and return paths. In this return path, the polarization state of the reflected light and the polarization selectivity of the polarization-selective diffraction element 24 are combined so as to produce a diffractive action.

Figure 26:
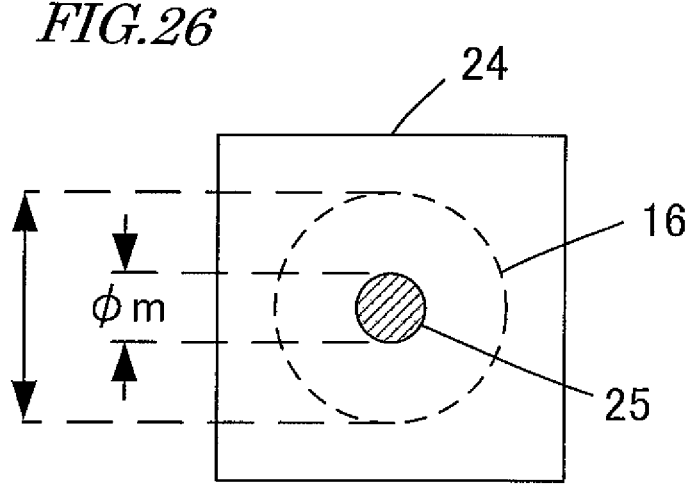
FIG. 26 A diagram showing a diameter of an entire beam 16 and a diameter φm of a central portion 25 when passing through a polarization-selective diffraction element 24.

The light entering a region 25 shown in FIG. 26 is diffracted light 26 shown in FIG. 25, which is diffracted to a position for not entering the photodetecting portion of the photodetector 15. Herein, the direction of diffraction may be arbitrary. It may be an upper-lower direction on the plane of the figure as shown in FIG. 25, or a direction which is perpendicular to the plane of the figure. The region of the polarization-selective diffraction element 24 excluding the region 25 has no diffraction grating, or has a grating with a weak diffractive action, so that much of the light passing therethrough enters the photodetector 15 as detected light 9. These are utilized for generating a focus error signal, a tracking error signal, and an RF signal.

The diameter of a cross section 16 of the main beam when passing through the polarization-selective diffraction element 24 is designated as $\phi s$, and the diameter of the return-path diffractive action region 25 as $\phi m$. Then, as in Embodiment 3, it is possible to prevent four kinds of adjacent stray light from entering the photodetecting portion 15 more effectively than the construction in which a light shielding portion is provided between the collimator lens 3 and the photodetector 15.

Moreover, the wavelength plate 5 and the polarization-selective diffraction element 24 may be constructed so as to be driven integrally with the objective lens 6. To that end, for example, the wavelength plate 5 and the polarization-selective diffraction element 24 may be disposed inside an actuator (not shown) which drives the objective lens 6. This allows the optical member for setting a diffractive region to be moved integrally with the objective lens 6. As a result, even when the objective lens 6 is laterally shifted during a tracking operation, the diffractive region can always be maintained at the beam center. This provides an excellent advantage in that the effects of removing stray light from other layers are not lost even when there is a large shift of the objective lens due to tracking, i.e., in the case where recording or reproduction is to be performed for a highly eccentric disc.

Moreover, the beam diameter is larger in the zone from the collimator lens 3 to the objective lens 6 than in the zone from the collimator lens 3 to the photodetector 15. This also provides an advantage of facilitating the positioning of the diffractive region with respect to the beam center.

In Embodiment 3, there are regions of different polarization states for the forward-path light to be converged onto the optical disc 7, thus leading to a possibility that the convergence performance may be deteriorated due to a decreased coherence of light. In the present embodiment, however, the polarization state of the light converged on the optical disc 7 is uniform, thus providing an advantage in that the beam convergence performance on the optical disc 7 is not deteriorated.

When producing both of optical pickup devices of a multilayer-supporting type and optical pickup devices of a non-multilayer-supporting type, it is preferable that the optical element be sharable and that the fundamental internal structure be sharable. According to the construction of the present embodiment, an optical pickup device of a multilayer-supporting type can be obtained by adding an optical element (polarization-selective diffraction element 24) to the parallel light zone from the collimator lens 3 to the wavelength plate 5, whereas an optical pickup device of a non-multilayer-supporting type can be obtained simply by omitting the optical element from the parallel light zone. Optically speaking, the positioning of the other optical parts does not need to be changed, thus providing an excellent advantage in that it is easy to differentiate multilayer-supporting products from non-multilayer-supporting products in production.

The wavelength plate 5 and the polarization-selective diffraction element 24 in the present example may be formed as an integral piece.

In the case where problems in terms of wave aberration occur because of an optical phase difference between the region having the polarization-selective diffraction grating and the remaining region, the optical phase difference can be corrected for by varying the thickness between the region corresponding to the polarization-selective diffraction grating region and the remaining region, in the polarization-selective diffraction element and other optical elements. In the wavelength plate approach described in Embodiment 3, too, if the optical phase difference between the central portion and the remaining region is a problem, the optical phase difference may be corrected for by varying the thickness between the portion for setting a light shielding region and the remaining portion of the wavelength plate. Alternatively, a correction may be made by, in another optical element such as an objective lens, varying the thickness between its region corresponding to a portion for setting a light shielding region and the remaining region.

Embodiment 5

In the present embodiment, an optical disc apparatus in which an optical pickup device of any of Embodiments 1 to 4 is mounted will be described.

Figure 27:
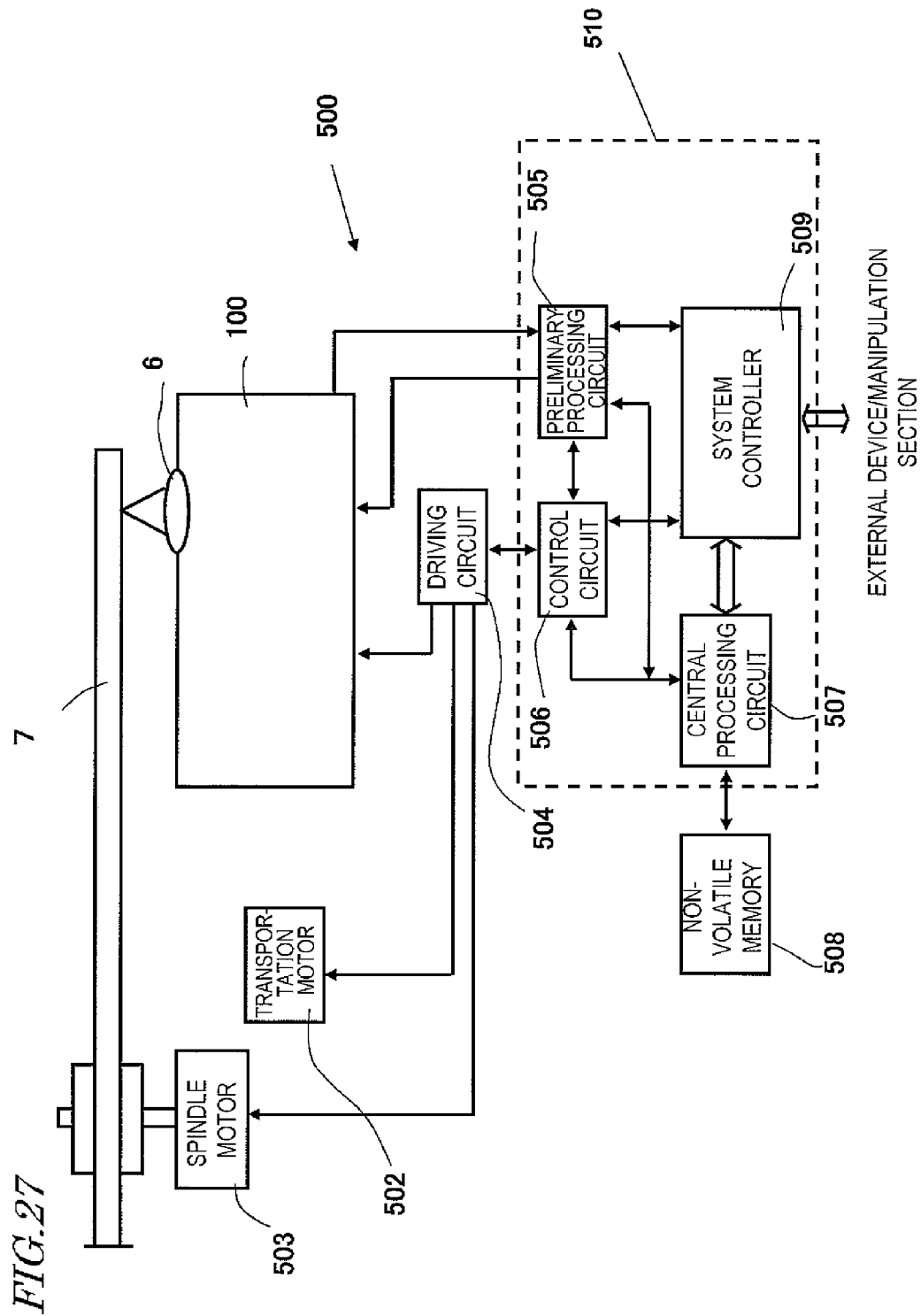
FIG. 27 A diagram showing the construction of an optical disc apparatus 500 according to Embodiment 5 of the present invention.
Figure 28:
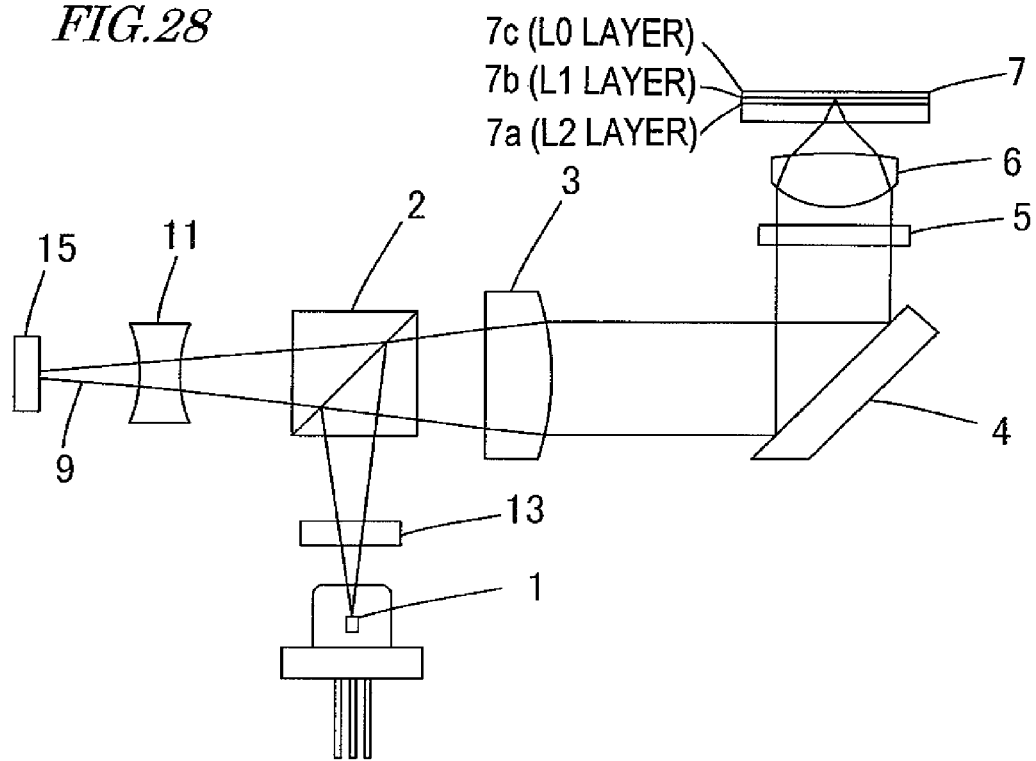
FIG. 28 A diagram showing an exemplary construction of a generic optical pickup.
Figure 29:
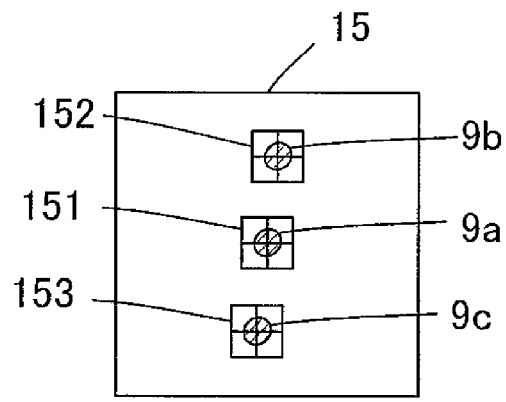
FIG. 29 A diagram showing the construction of a photodetector 15.
Figure 30:
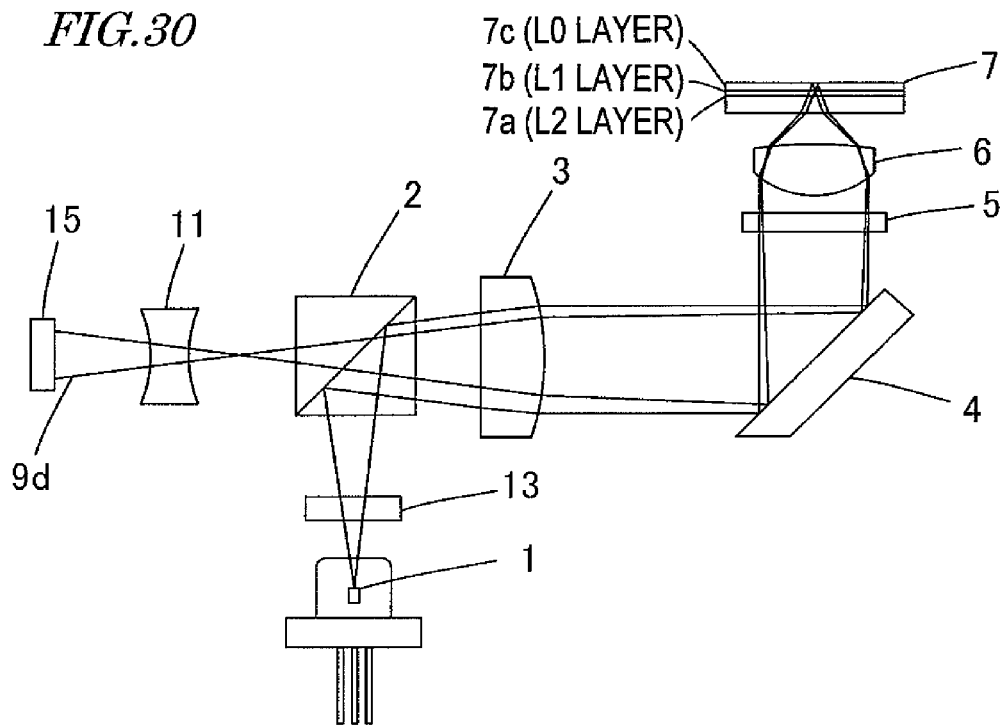
FIG. 30 A diagram showing an optical path of reflected light from a rearward-adjoining L0 layer (recording layer 7c) when light for recording or reproduction of information is converged on an L1 layer (recording layer 7b).
Figure 31:
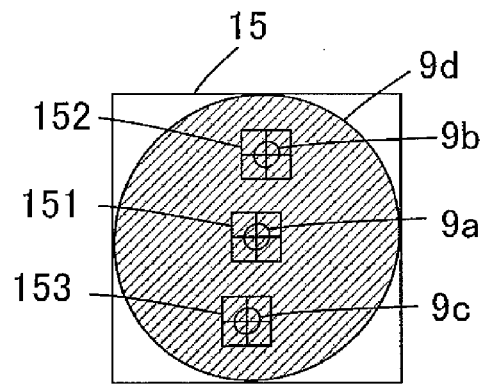
FIG. 31 A diagram showing reflected light 9d from an L0 layer upon a photodetector 15.
Figure 32:
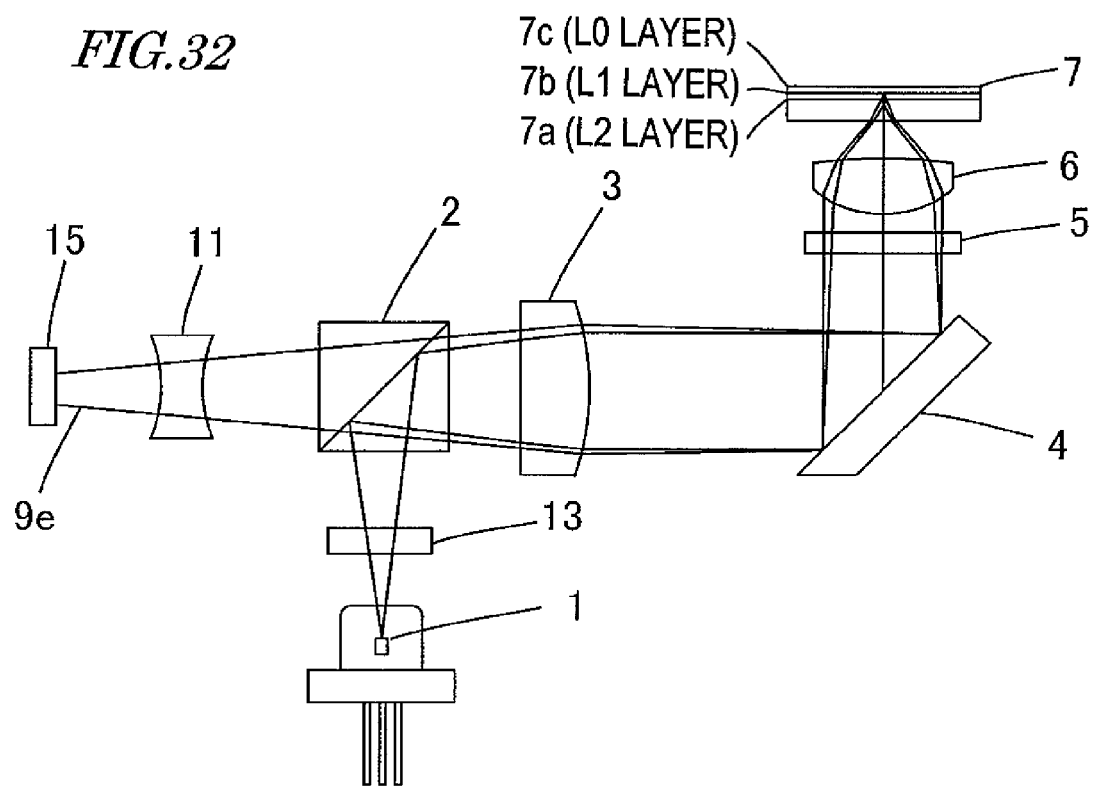
FIG. 32 A diagram showing an optical path of reflected light from a frontward-adjoining L2 layer (recording layer 7a) when light is converged on an L1 layer (recording layer 7b).
Figure 33:
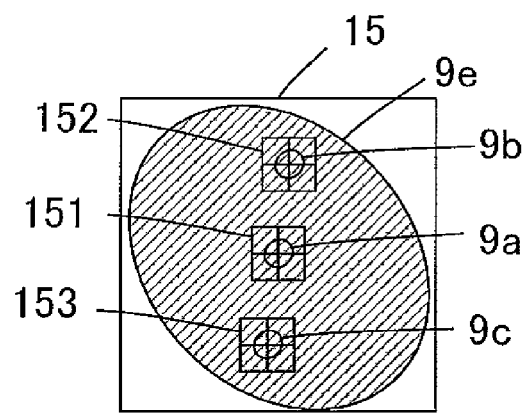
FIG. 33 A diagram showing reflected light 9e from an L2 layer upon a photodetector 15.
Figure 34:
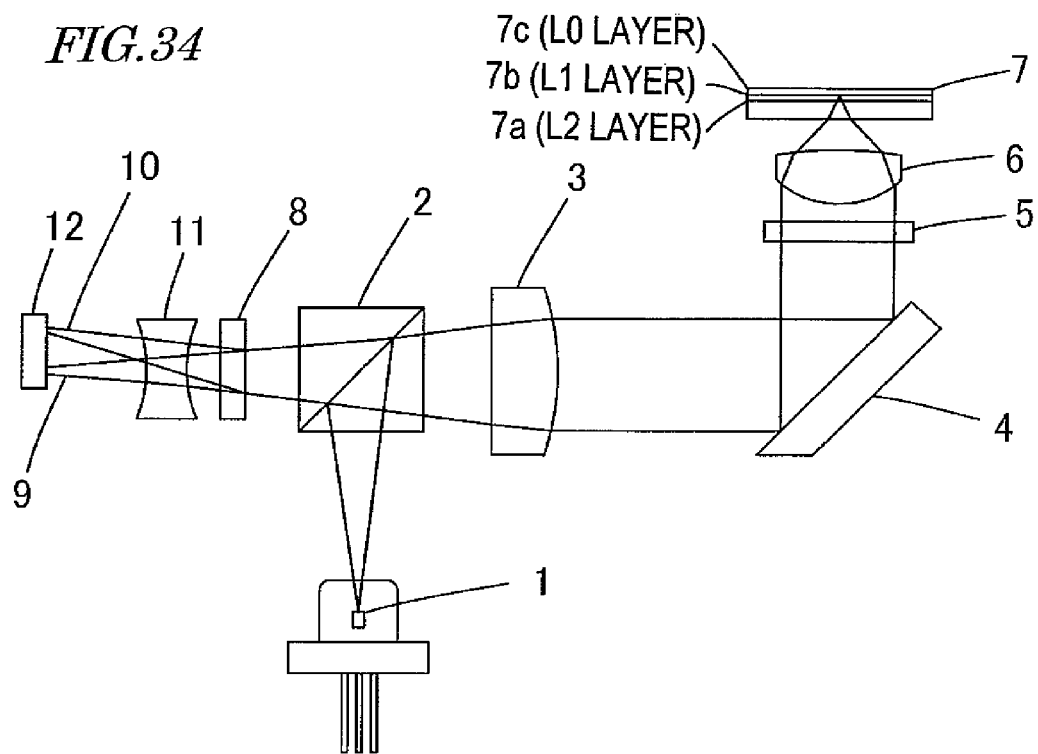
FIG. 34 A diagram for describing the construction and operation of an optical pickup device described in Patent Document 1.
Figure 35:
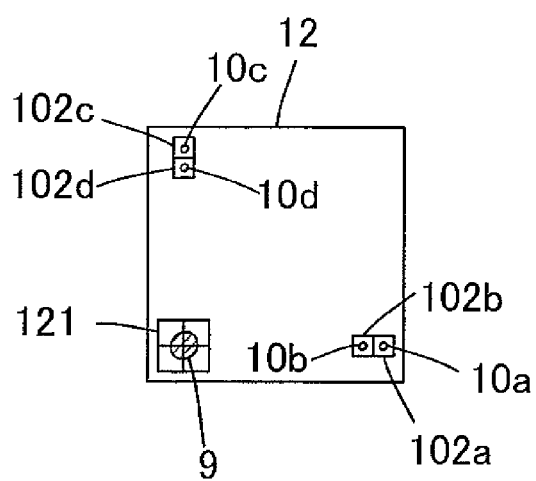
FIG. 35 A diagram showing the construction of a photodetector 12.
Figure 36:
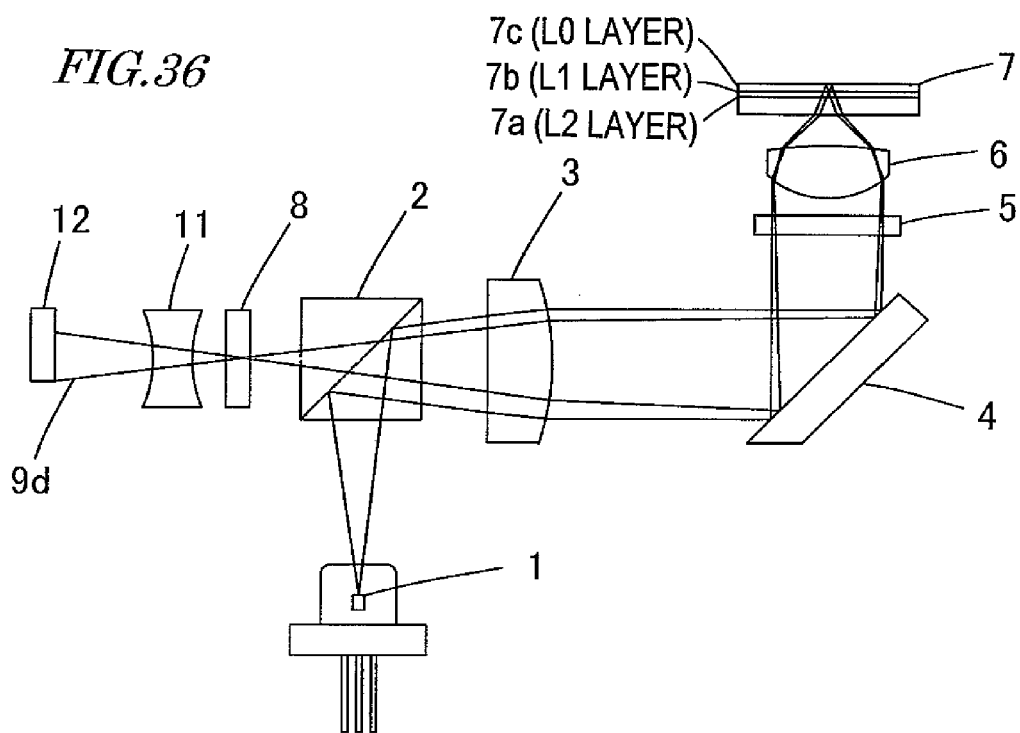
FIG. 36 A diagram showing an optical path of reflected light from a rearward-adjoining L0 layer when light is converged on an L1 layer.
Figure 37:
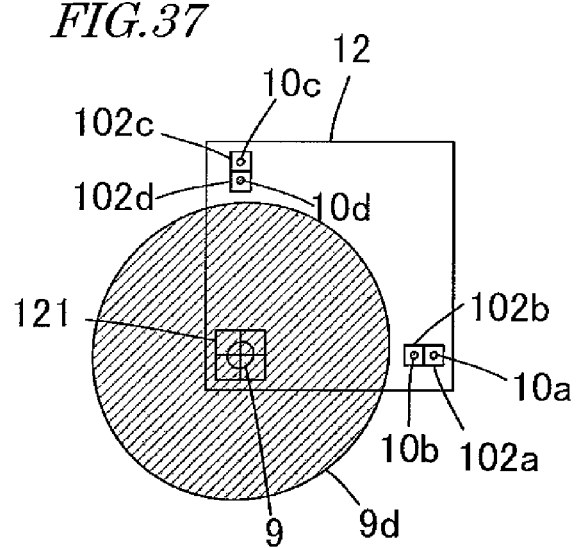
FIG. 37 A diagram showing reflected light 9d from an L0 layer upon a photodetector 12.
Figure 38:
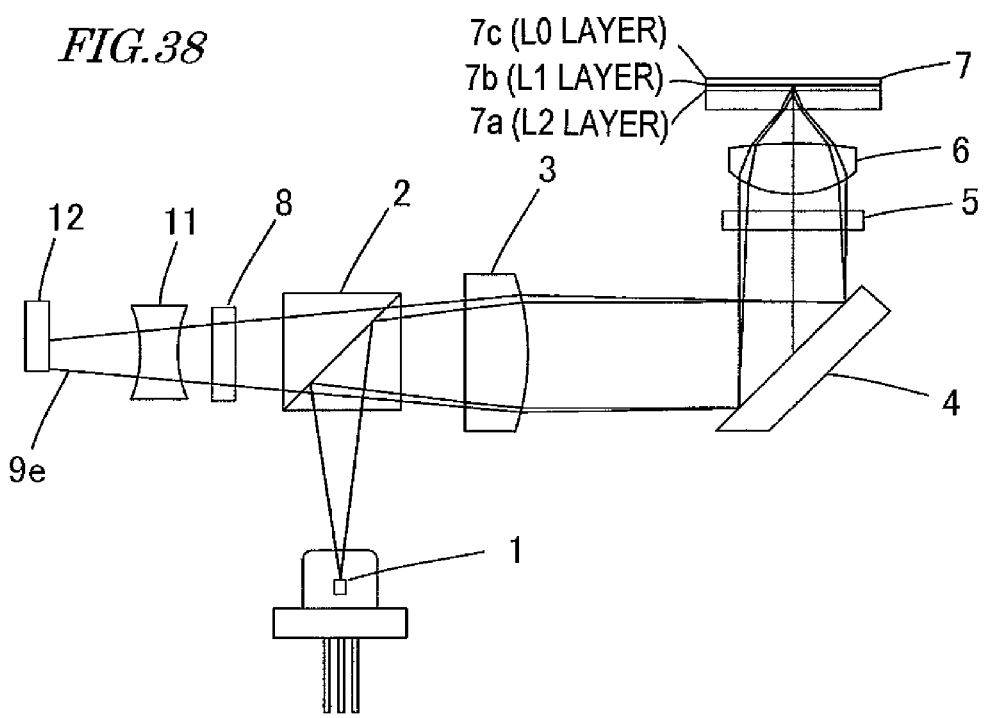
FIG. 38 A diagram showing behavior of reflected light from a frontward-adjoining L2 layer when light is converged on an L1 layer.
Figure 39:
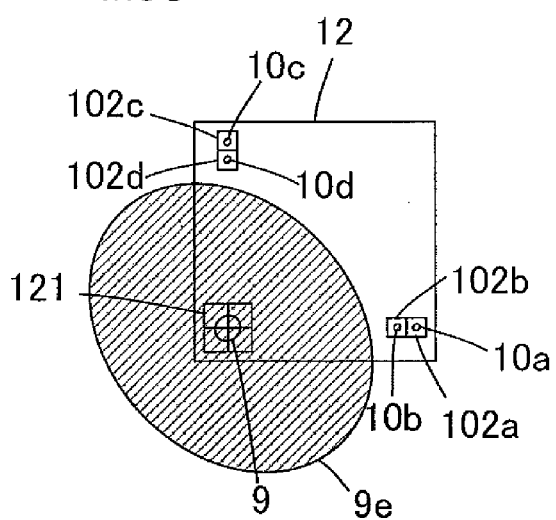
FIG. 39 A diagram showing reflected light 9e from an L2 layer upon a photodetector 12.

FIG. 27 shows the construction of an optical disc apparatus 500 according to the present embodiment. As one example, the optical disc apparatus 500 shown in FIG. 27 may have the optical pickup device 100 of Embodiment 1 mounted therein.

The optical disc apparatus 500 can be used for a personal computer (PC), an optical disc player, an optical disc recorder, or the like.

The optical disc apparatus 500 includes the optical pickup device 100, a transportation motor 502, a spindle motor 503, a driving circuit 504, a non-volatile memory 508, and a control section 510.

As mentioned above, the optical pickup device 100 has the construction described in Embodiment 1.

Based on an instruction from the driving circuit 504, the transportation motor 502 moves the optical pickup device 100.

Based on an instruction from the driving circuit 504, the spindle motor 503 rotates the optical disc 7.

The driving circuit 504 controls the operation of a light source which is provided in the optical pickup device 100.

Moreover, the driving circuit 504 controls driving parameters such as the amount of move of the optical pickup device 100 caused by the transportation motor 502 and the rotation speed of the spindle motor, based on instructions from the control section 510.

The non-volatile memory 508 retains information which is necessary for controlling the optical pickup device 100, for example.

The control section 510 controls the operation of the optical disc apparatus 500.

The control section 510 includes a preliminary processing circuit 505, a control circuit 506, a central processing circuit 507, and a system controller 509.

Data which is optically read from the optical disc 7 is converted to an electrical signal by the photodetector 15 of the optical pickup device 100 (e.g., FIG. 1). This electrical signal is input to the preliminary processing circuit 5. Based on the electrical signal obtained from the optical pickup 100, the preliminary processing circuit 505 generates servo signals including a focus error signal and a tracking error signal, and performs analog signal processing, e.g., waveform equalization of the reproduction signal, digital slicing, and synchronization data.

The servo signals generated by the preliminary processing circuit 505 are input to the control circuit 506. Via the driving circuit 504, the control circuit 506 causes a light spot of the optical pickup device 100 to follow on the optical disc 7. The driving circuit 504 is connected to the optical pickup 100, the transportation motor 502, and the spindle motor 503. The driving circuit 504 realizes a series of controls, such as focus control and tracking control of the objective lens 6, transportation control, and spindle motor control via digital servo. The driving circuit 504 drives an actuator (e.g., a coil and a magnet) for the objective lens 6, drives the transportation motor 502 for transporting the optical pickup device 100 to the inner periphery or the outer periphery of the optical disc 7, and drives the spindle motor 503 for rotating the optical disc 7.

The synchronization data generated by the preliminary processing circuit 505 is subjected to digital signal processing at the system controller 509, and the recording/reproduction data are transferred to a host via an interface circuit not shown. The preliminary processing circuit 505, the control circuit 506, and the system controller 509 are connected to the central processing circuit 507, and operate based on commands from the central processing circuit 507. A program defining a series of operations including the above control operations is previously stored in a semiconductor device, such as the non-volatile memory 508, in the form of firmware. Herein, the control operations include an operation of rotating the optical disc 7, an operation of transporting the optical pickup 100 to a target position, an operation of forming a light spot and causing it follow on a target track of the optical disc 7, and so on. Such firmware is read by the central processing circuit 507 from the non-volatile memory 508 in accordance with the required mode of operation.

The preliminary processing circuit 505, the control circuit 506, the central processing circuit 507, the non-volatile memory 508, and the system controller 509 can be implemented on a semiconductor chip (IC chip). The driving circuit 504 can be implemented on a driver IC.

Thus, Embodiments of the present invention have been described. As was mentioned at the beginning of this section, the present invention is not limited to the above Embodiments, but may be implemented in various manners.

Although the above Embodiments illustrate exemplary constructions where the photodetecting portions for the tracking error signal are disposed at positions away from the main beam photodetecting portion which are not struck by stray light from other layers, the photodetecting portion placement based on the generic three beam detection method, which has been described in Embodiment 1 and the conventional example, may be adopted. In that case, the influences of stray light from other layers on the tracking error signal cannot be eliminated, but even when the three beam method or the DPP (differential push-pull) method is the primary choice as the tracking error approach, the device performance in the recording or reproduction of a multilayer disc can be improved by removing the stray light from other layers striking the main beam photodetecting portion as in the present example.

The above-described Embodiment illustrates an exemplary construction where the relative phase difference between the central portion (the portion for setting a light shielding region) and the remaining region of the wavelength plate 18 is $\lambda/4$, such that the portion for setting a light shielding region is capable of substantially complete blocking. However, as described above, from the standpoint of signal quality of the light from the converged layer, it is preferable that the amount of shielded light is as small as possible. Therefore, by setting the relative phase difference between the central portion and the remaining region to be any arbitrary value between $\lambda/4$ and 0, the light amount in the central portion entering the photodetector can be attenuated to an arbitrary ratio. It is also possible to ensure an optimally balanced design, between the effect of removing stray light from other layers and the recording/reproduction quality with light from the converged layer, based on the two parameters of the size of the light attenuating region and attenuation ratio to be set.

Figure 24:
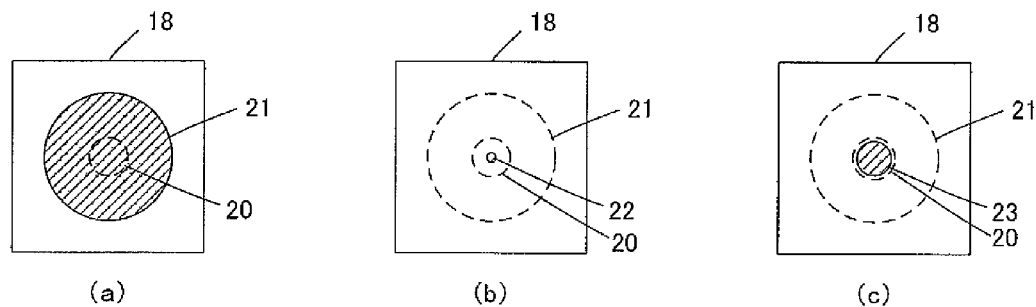
FIG. 24 A diagram showing sizes on a wavelength plate 18 when a photodetecting portion 121 is struck by L1-L1 light, L1-L0 light, and L1-L2 light when light is converged on an L1 layer.

As a light splitting means, instead of a combination of a wavelength plate and a polarization beam splitter or a polarization-selective diffraction element, an optical element having a light shielding portion or a light attenuating portion that acts only on the central portion 20 of FIG. 24 may be disposed, for example. These can be easily composed by a reflection film or an attenuation filter.

Although the above description is conveniently directed to a multilayer disc having three recording layers, it will be appreciated that the present invention is similarly applicable to multilayer discs of four layers or more.

INDUSTRIAL APPLICABILITY

The present invention is applicable to optical pickups which are capable of recording information onto an optical disc, or reproducing information on an optical disc. For example, it is applicable to personal computers, stationary-type players, game machines, or other various appliances.

REFERENCE SIGNS LIST

| | |
|---|---|
| 1 | semiconductor laser |
| 2 | polarization beam splitter |
| 3 | collimating lens |
| 4 | mirror |
| 5, 18 | wavelength plate |
| 6 | objective lens |
| 7 | storage medium |
| 7a | L2 layer |
| 7b | L1 layer |
| 7c | L0 layer |
| 8 | diffraction element |
| 9, 10, 10a, 10b, 10c, 10d | detected light |

-continued

REFERENCE SIGNS LIST

| | |
|---|---|
| 9a | main beam |
| 9b, 9c | sub beam |
| 9d, 9e | reflected light |
| 11 | detection lens |
| 12, 15 | photodetector |
| 13 | diffraction grating |
| 14 | light shielding member |
| 16 | cross section of main beam |
| 17 | light shielding portion |
| 19 | entire beam |
| 20 | central portion |
| 21 | size of light from converged layer |
| 22 | region through which L1-L0 light enters photodetecting portion 121 |
| 23 | region through which L1-L2 light enters photodetecting portion 121 |
| 24 | polarization-selective diffraction element |
| 25 | return-path diffractive action region |
| 26 | diffracted light |
| 121, 102a, 102b, 102c, 102d, 151, 152, 153 | photodetecting portion |
| 111 | light from converged layer |
| 112 | L0 stray light when converging on L1 |
| 113 | L1 stray light when converging on L2 |
| 114 | L2 stray light when converging on L1 |
| 115 | L1 stray light when converging on L0 |

The invention claimed is:

1. An optical pickup device for performing recording or reproduction of information by converging light onto an optical disc having three recording layers, the optical pickup device comprising:
   a light source for emitting light;
   a collimator lens for converting the light emitted from the light source into substantially parallel light;
   an objective lens for converging the light having been converted to the substantially parallel light onto the optical disc;
   a photodetector for receiving reflected light from the optical disc via the collimator lens; and
   a light shielding member provided in an optical path between the collimator lens and the photodetector for blocking a part of the reflected light and transmitting the rest, wherein,
   from near the objective lens, the optical disc includes the first layer, the second layer, and a third layer;
   the light shielding member is disposed at a position satisfying the condition $d > d1$ to block a part of reflected light from the second layer when the light is converged on the first layer, where d is an optical path length from the photodetector to the light shielding member; and d1 is a distance from the detector to a position at which reflected light from the second layer becomes focused between the collimator lens and the photodetector; and
   the light shielding member is disposed at a position satisfying the condition $d \geq 2 \times d1 \times d2/(d1+d2)$ when the light is converged by the objective lens onto the second layer, where d2 is a distance from the detector to a position at which reflected light from the third layer becomes focused between the collimator lens and the photodetector.

2. The optical pickup device of claim 1, wherein,
   the light shielding member includes a substantially circular light shielding portion for blocking a part of the reflected light; and
   the light shielding portion completely blocks reflected light from the second layer when the light is converged on the first layer and reflected light from the third layer when the light is converged on the second layer, and the light shielding portion has a radius which is 30% or less, when the light is converged on an $n^{th}$ layer (n: 1, 2, 3), of a radius of reflected light from the $n^{th}$ layer entering the light shielding member.

3. The optical pickup device of claim 1, wherein, the light shielding member includes a substantially circular light shielding portion for blocking a part of the reflected light; and the light shielding portion blocks 50% or less of either reflected light from the second layer when the light is converged on the first layer or reflected light from the third layer when the light is converged on the second layer.

4. An optical disc apparatus comprising:

the optical pickup device of claim 1;

a transportation motor for moving the optical pickup device;

a spindle motor for rotating the optical disc;

a driving circuit for driving the transportation motor and the spindle motor; and a control section for designating driving parameters for the transportation motor and the spindle motor to the driving circuit.

* * * * *